United States Patent
Yuan et al.

(10) Patent No.: US 11,388,033 B2
(45) Date of Patent: Jul. 12, 2022

(54) DATA TRANSMISSION METHOD AND DEVICE, STORAGE MEDIUM, AND ELECTRONIC DEVICE

(71) Applicant: ZTE Corporation, Shenzhen (CN)

(72) Inventors: Zhifeng Yuan, Shenzhen (CN); Yuzhou Hu, Shenzhen (CN); Weimin Li, Shenzhen (CN); Jianqiang Dai, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/960,139

(22) PCT Filed: Jan. 4, 2019

(86) PCT No.: PCT/CN2019/070491
§ 371 (c)(1),
(2) Date: Jul. 6, 2020

(87) PCT Pub. No.: WO2019/134689
PCT Pub. Date: Jul. 11, 2019

(65) Prior Publication Data
US 2021/0119845 A1    Apr. 22, 2021

(30) Foreign Application Priority Data

Jan. 5, 2018  (CN) .......................... 201810011799.2
May 4, 2018  (CN) .......................... 201810425568.6

(51) Int. Cl.
*H04L 27/26* (2006.01)
*H04L 25/02* (2006.01)

(52) U.S. Cl.
CPC ...... *H04L 27/2628* (2013.01); *H04L 25/0224* (2013.01); *H04L 27/265* (2013.01); *H04L 27/2636* (2013.01)

(58) Field of Classification Search
CPC ............. H04L 27/2628; H04L 27/2636; H04L 25/0224; H04L 27/265
See application file for complete search history.

(56) References Cited

U.S. PATENT DOCUMENTS

2004/0022174 A1    2/2004 Li
2005/0254596 A1    11/2005 Naguib
(Continued)

FOREIGN PATENT DOCUMENTS

CN    101027866 A    8/2007
CN    101208878 A    6/2008
(Continued)

OTHER PUBLICATIONS

International Search Report for corresponding application PCT/CN2019/070491 filed Jan. 4, 2019; dated Mar. 29, 2019.
(Continued)

*Primary Examiner* — David S Huang
(74) *Attorney, Agent, or Firm* — Cantor Colburn LLP

(57) ABSTRACT

The present disclosure provides a data transmission method, which includes that: M conjugate symbol pairs are generated, where M is more than or equal to 1; and the symbol pairs in the conjugate relationship are transmitted. The present disclosure also provides a data transmission device, a storage medium and an electronic device.

18 Claims, 11 Drawing Sheets

(56) References Cited

U.S. PATENT DOCUMENTS

| | | | |
|---|---|---|---|
| 2011/0110304 A1* | 5/2011 | Kuchi | H04L 25/021 370/328 |
| 2011/0142076 A1 | 6/2011 | Ko | |
| 2011/0228863 A1* | 9/2011 | Papasakellariou | H04L 1/1861 375/259 |
| 2016/0087829 A1* | 3/2016 | Jia | H04L 27/2623 375/267 |

FOREIGN PATENT DOCUMENTS

| | | |
|---|---|---|
| CN | 101617491 A | 12/2009 |
| WO | 2009153808 A2 | 12/2009 |
| WO | 2014155065 A1 | 10/2014 |

OTHER PUBLICATIONS

European Search Report for corresponding application EP 19735957: Report dated Feb. 12, 2021.

* cited by examiner

All the 7 OFDM data symbols are duplicated and conjugated

M frequency-domain symbols S, herein M=12

The M frequency-domain symbols are duplicated and conjugated

DATA TRANSMISSION METHOD AND DEVICE, STORAGE MEDIUM, AND ELECTRONIC DEVICE

CROSS-INTERFERENCE TO RELATED APPLICATIONS

The present application claims priority to Chinese Patent Application No. 201810011799.2, filed before the China National Intellectual Property Administration on Jan. 5, 2018, and Chinese Patent Application No. 201810425568.6, filed before the China National Intellectual Property Administration on May 4, 2018, the entire contents of which are incorporated herein by reference.

TECHNICAL FIELD

The present disclosure relates to the field of communication, and for example, to a data transmission method and device, a storage medium, and an electronic device.

BACKGROUND

For either conventional grant-based data transmission or emerging grant-free data transmission, channel estimation accuracy greatly influences demodulation performance. Channel estimation accuracy is usually influenced by a pilot solution and a channel estimation method.

A channel estimation method in a related art has the following shortcoming.

A pilot occupies a certain time-frequency resource and serves as a kind of overhead. Particularly in a scenario with a high coverage requirement, if a Signal Noise Ratio (SNR) of a received signal (including a data signal and a pilot signal) is relatively low and pilot-based channel estimation is executed under a low-SNR condition, in order to ensure the estimation accuracy, more time-frequency resources are usually required to arrange more pilots to improve the SNR of the pilot. Consequently, the overhead is further increased.

In a grant-free access scenario, there may be such a situation that different users use the same pilot, i.e., there may be pilot collision. The pilot collision seriously impairs the grant-free access performance. For reducing the influence of the pilot collision, more pilots are usually required to be designed to reduce the collision probability, and more pilots usually means that more time-frequency resources need to be occupied by the pilots and the pilot detection complexity is higher.

SUMMARY

Embodiments of the present disclosure provide a data transmission method and device, a storage medium, and an electronic device, to solve the problems of time-frequency resource waste and inaccurate channel estimation caused by a pilot collision in the related art.

According to an embodiment of the present disclosure, a data transmission method is provided, which may include that: M conjugate symbol pairs are generated, where M is more than or equal to 1; and the symbol pairs in the conjugate relationship are transmitted. According to an embodiment of the present disclosure, another data transmission method is provided, which may include that: M symbols $[d_0, d_1, \ldots d_{M-1}]$ are generated; the M symbols $[d_0, d_1, \ldots d_{M-1}]$ are converted to generate M symbols $[e_0, e_1, \ldots e_{M-1}]$; and $[d_0, d_1, \ldots d_{M-1}]$ and $[e_0, e_1, \ldots e_{M-1}]$ are transmitted, where M is more than or equal to 1.

According to an embodiment of the present disclosure, another data transmission method is provided, which may include that: M conjugate symbol pairs are received, where M is more than or equal to 1; and channel estimation is performed by use of the symbol pairs.

According to another embodiment of the present disclosure, a data transmission device is provided, which may include: a generation module, configured to generate M conjugate symbol pairs, where M is more than or equal to 1; and a transmitting module, configured to transmit the conjugate symbol pairs.

According to another embodiment of the present disclosure, another data transmission device is provided, which may include: a first generation module, configured to generate M symbols $[d_0, d_1, \ldots d_{M-1}]$; a second generation module, configured to convert the M symbols $[d_0, d_1, \ldots d_{M-1}]$ to generate M symbols $[e_0, e_1, \ldots e_{M-1}]$; and a transmitting module, configured to transmit $[d_0, d_1, \ldots d_{M-1}]$ and $[e_0, e_1, \ldots e_{M-1}]$, where M is more than or equal to 1.

According to another embodiment of the present disclosure, another data transmission device is provided, which may include: a receiving module, configured to receive M conjugate symbol pairs, where M is more than or equal to 1; and an estimation module, configured to perform channel estimation by use of the symbol pairs.

According to another embodiment of the present disclosure, a storage medium is also provided, in which a computer program may be stored, where the computer program is configured to run to execute the method in any abovementioned embodiment.

According to another embodiment of the present disclosure, an electronic device is also provided, which may include a memory and a processor. A computer program may be stored in the memory. The processor may be configured to run the computer program to execute the method in any abovementioned embodiment.

DETAILED DESCRIPTION OF THE EMBODIMENTS

The present disclosure will be described below with reference to the drawings and in combination with the embodiments. The embodiments in the present application and characteristics in the embodiments may be combined without conflicts.

Terms like "first" and "second" in the specification, claims and accompanying drawings of the present disclosure are used for differentiating the similar objects, but do not have to describe a specific order or a sequence.

Figure 1:
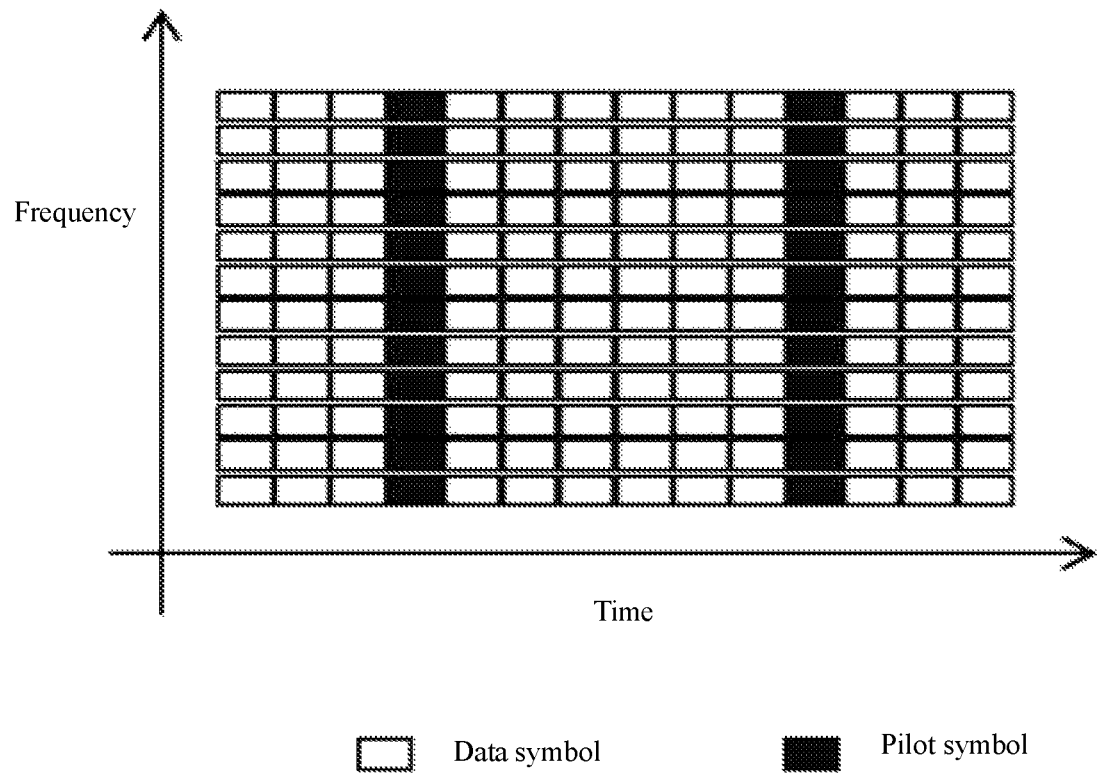
FIG. 1 is a schematic diagram of an Orthogonal Frequency Division Multiplexing (OFDM)-modulation-based pilot solution according to the related art of the present disclosure.

In FIG. 1, each cell is a Resource Element (RE) of an OFDM/DFT-S-OFDM/SC-FDMA symbol, i.e., a subcarrier resource of the OFDM/DFT-S-OFDM/SC-FDMA symbol. Since a subcarrier belongs to a frequency domain, an RE may also be called a frequency-domain RE.

Figure 2:
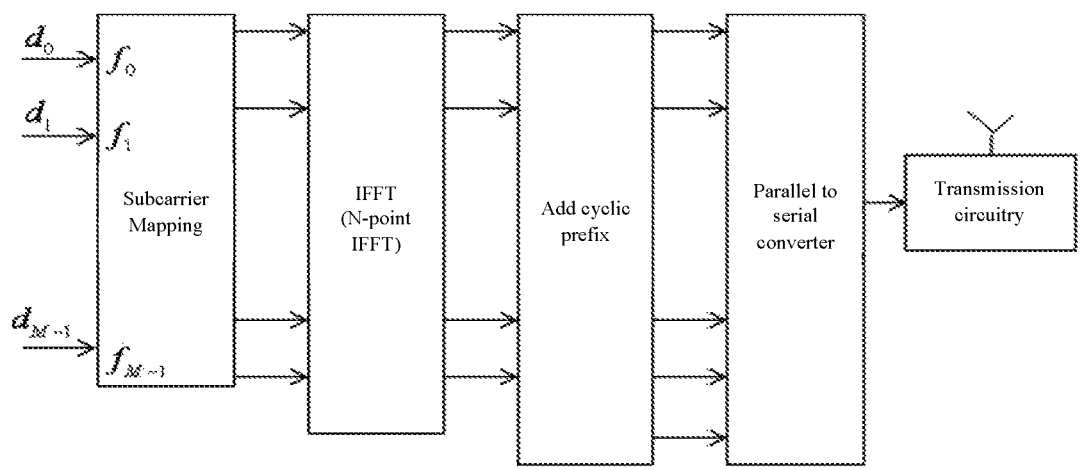
FIG. 2 is a schematic diagram of OFDM modulation according to the related art of the present disclosure.

FIG. 2 is a schematic diagram of OFDM modulation according to the related art of the present disclosure. Multi-carrier OFDM modulation is shown in FIG. 2. Digital amplitude-phase modulation symbols (i.e., xPhase Shift Keying (xPSK)/x Quadrature Amplitude Modulation (xQAM) symbols, for example, Binary Phase Shift Keying (BPSK), Quadrature Phase Shift Keying (QPSK), 16 Quadrature Amplitude Modulation (16QAM) . . . ) (called modulation symbols sometimes) are grouped at first, each group including M symbols, and $D=[d_0,d_1, \ldots d_{M-1}]$ is directly mapped to M subcarriers of an OFDM symbol. In other words, each RE directly carries a digital amplitude-phase modulation symbol, or the M digital amplitude-phase modulation symbols are carried in the OFDM symbol (because the OFDM symbol includes the M subcarriers herein), or the OFDM symbol carries the M digital amplitude-phase modulation symbols.

In the embodiment, a representation like $D=[d_0,d_1, \ldots d_{M-1}]$ indicates that D is a symbol block consisting of M symbols and the symbols therein are sequentially arranged. In an embodiment, D, if being involved in a matrix operation, is automatically transformed to a column vector with length of M. That is, if D is involved in the matrix operation, for example, $S=QD$, where Q is an M-column matrix, then $D=[d_0,d_1, \ldots d_{M-1}]^T$, and D is a column vector with length of M. Herein, $[\ ]^T$ refers to a transposition operation.

In an embodiment, $D=[d_0,d_1, \ldots d_{M-1}]$ is a digital amplitude-phase modulation symbol and is directly mapped to a subcarrier.

Figure 3:
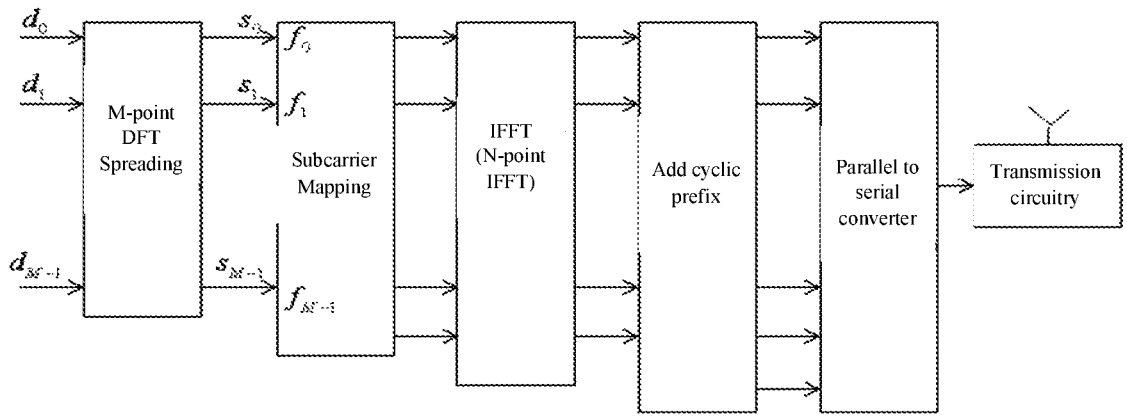
FIG. 3 is a schematic diagram of a frequency-domain generation method for a Single-Carrier Frequency-Division Multiple Access (SC-FDMA) signal according to the related art of the present disclosure.

SC-FDMA modulation may substantially keep high properties of multi-carrier OFDM and may also have the key advantages of low Peak-to-Average Power Radio/Cubic Metric (PAPR/CM) of a single-carrier signal. Therefore, SC-FDMA is adopted as a carrier modulation method for uplink transmission in an LTE standard. The following two SC-FDMA signal generation methods may be adopted. 1) One is a Discrete Fourier Transform (DFT)-spread-based frequency-domain generation method, i.e., a DFT-S-OFDM method. FIG. 3 is a schematic diagram of a frequency-domain generation method for an SC-FDMA signal according to the related art of the present disclosure, as shown in FIG. 3.

Figure 4:
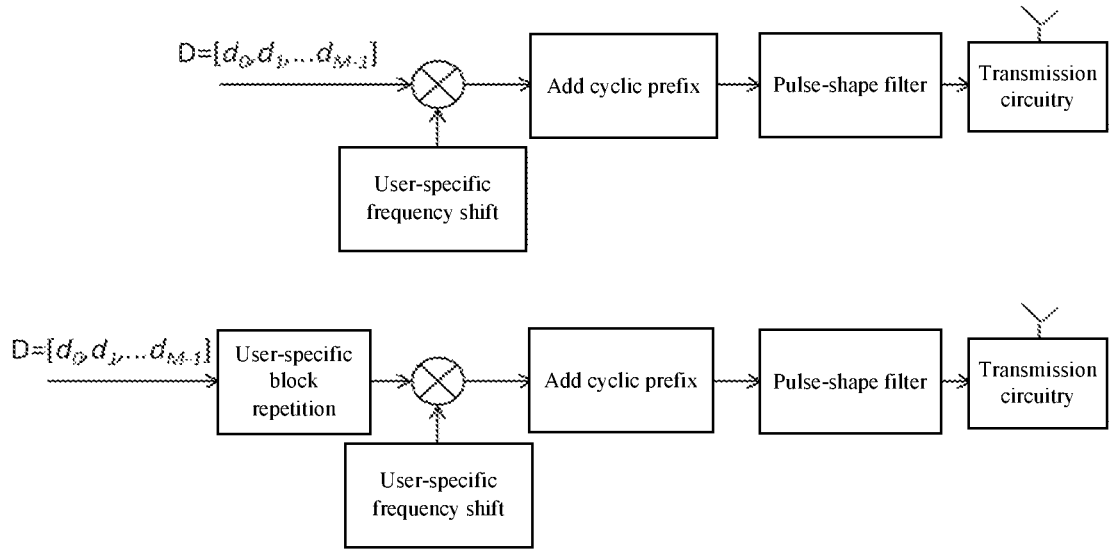
FIG. 4 is a schematic diagram of a time-domain generation method for an SC-FDMA signal according to the related art of the present disclosure.

2) The other is a direct time-domain generation method. FIG. 4 is a schematic diagram of a time-domain generation method for an SC-FDMA signal according to the related art of the present disclosure, as shown in FIG. 4.

FIG. 3 illustrates a frequency-domain generation method for SC-FDMA, i.e., DFT-S-OFDM modulation. Like a multi-carrier OFDM manner, each DFT-S-OFDM symbol also carries M digital amplitude-phase modulation symbols $D=[d_0,d_1, \ldots d_{M-1}]$. However, unlike the multi-carrier OFDM manner, the M digital amplitude-phase modulation symbols $D=[d_0,d_1, \ldots d_{M-1}]$ in the DFT-S-OFDM modulation symbol are transmitted in a time domain rather than directly carried in a frequency-domain RE. In fact, M REs of a DFT-S-OFDM symbol do not directly carry M digital amplitude-phase modulation symbols $D=[d_0,d_1, \ldots d_{M-1}]$ but carry M symbols $S=[s_0,s_1, \ldots s_{M-1}]$ generated after DFT-spread is performed on the M digital amplitude-phase modulation symbols $D=[d_0,d_1, \ldots d_{M-1}]$. A relationship between S and D may be represented as S=DFT(D). Herein, DFT( ) refers to a DFT-spread transform function or a DFT-spread transform function/operation. An accurate operation rule for DFT may be represented with a matrix operation. A matrix operation rule of a common M-point DFT function or operation S=DFT(D) is the following matrix operation:

$$\begin{bmatrix} s_0 \\ s_1 \\ \vdots \\ s_{M-1} \end{bmatrix} = \frac{1}{\sqrt{M}} \begin{bmatrix} 1 & 1 & \cdots & 1 \\ 1 & e^{j\frac{2\pi}{M}} & \cdots & e^{j\frac{2\pi}{M}(M-1)} \\ \vdots & \vdots & e^{j\frac{2\pi}{M}nm} & \vdots \\ 1 & e^{j\frac{2\pi}{M}(M-1)} & \cdots & e^{j\frac{2\pi}{M}(M-1)(M-1)} \end{bmatrix} \begin{bmatrix} d_0 \\ d_1 \\ \vdots \\ d_{M-1} \end{bmatrix}$$

namely $S = QD$, where $$Q = \frac{1}{\sqrt{M}} \begin{bmatrix} 1 & 1 & \cdots & 1 \\ 1 & e^{j\frac{2\pi}{M}} & \cdots & e^{j\frac{2\pi}{M}(M-1)} \\ \vdots & \vdots & e^{j\frac{2\pi}{M}nm} & \vdots \\ 1 & e^{j\frac{2\pi}{M}(M-1)} & \cdots & e^{j\frac{2\pi}{M}(M-1)(M-1)} \end{bmatrix}$$

is a transform matrix for such $M$-point $DFT$.

Q is an M×M matrix, i.e., a square matrix with M rows and M columns. Row indexes include a first row to an Mth row, and column indexes include a first column to an Mth column. An element in an (n+1)th row and an (m+1)th column is $$e^{j\frac{2\pi}{M}nm},$$

where M>m≥0 and M>n≥0.

A Q matrix involved in a matrix operation rule of another common M-point DFT function or operation S=DFT(D) is as follows:

$$Q = \frac{1}{\sqrt{M}} \begin{bmatrix} 1 & 1 & \cdots & 1 \\ 1 & e^{-j\frac{2\pi}{M}} & \cdots & e^{-j\frac{2\pi}{M}(M-1)} \\ \vdots & \vdots & e^{-j\frac{2\pi}{M}nm} & \vdots \\ 1 & e^{-j\frac{2\pi}{M}(M-1)} & \cdots & e^{-j\frac{2\pi}{M}(M-1)(M-1)} \end{bmatrix}$$

where an element in an (n+1)th row and an (m+1)th column is $$e^{-j\frac{2\pi}{M}nm},$$

where M>m≥0 and M>n≥0.

In the embodiment, in a matrix operation, a symbol block consisting of M symbols, like D=[$d_0, d_1, \ldots d_{M-1}$], is automatically transformed to a column vector. That is, in the matrix operation, D=[$d_0, d_1, \ldots d_{M-1}$]$^T$. Herein, T refers to the transposition operation.

It can be seen that DFT-spread transform is a linear operation. Therefore, a signal carried in each RE of a DFT-S-OFDM symbol is a linear combination of M digital amplitude-phase modulation symbols D=[$d_0, d_1, \ldots d_{M-1}$].

FIG. 4 illustrates a time-domain generation method for SC-FDMA. This method involves no DFT and Inverse Fast Fourier Transform (IFFT) operations, is easier to implement and suitable for some scenarios requiring low implementation complexity, and includes two conditions, i.e., a condition in which there is no block duplication and a condition in which there is block duplication.

Unlike the multi-carrier OFDM manner, in SC-FDMA modulation, the M digital amplitude-phase modulation symbols D=[$d_0, d_1, \ldots d_{M-1}$] are directly transmitted in the time domain rather than directly carried in the RE.

The time-domain generation method for SC-FDMA does not involve explicit time-frequency DFT and IFFT, thus no symbol carried in a frequency-domain subcarrier is explicitly generated or no symbol carried in a frequency-domain RE is explicitly generated in a generation process, but frequency-domain symbols [$s_0, s_1, \ldots s_{M-1}$] in M subcarriers of an SC-FDMA symbol may still be generated only by transforming the SC-FDMA symbol to a frequency domain by DFT. Therefore, it may be considered that an SC-FDM symbol generated by the time-domain generation method for SC-FDMA implicitly includes M frequency-domain symbols S=[$s_0, s_1, \ldots s_{M-1}$] in M subcarriers or implicitly includes M frequency-domain symbols S=[$s_0, s_1, \ldots s_{M-1}$] carried in M frequency-domain REs and the M frequency-domain symbols S=[$s_0, s_1, \ldots s_{M-1}$], and the M time-domain digital amplitude-phase modulation symbols D=[$d_0, d_1, \ldots d_{M-1}$] may also be transformed by DFT/Inverse Discrete Fourier Transform (IDFT), namely S=DFT(D). By contrast, the frequency-domain generation method, i.e., DFT-S-OFDM modulation, involves explicit time-frequency DFT and IFFT, and the M frequency-domain symbols S=[$s_0, s_1, \ldots s_{M-1}$] in the M subcarriers may be explicitly generated in the generation process.

Therefore, it may be considered that an SC-FDMA symbol generated by the time-domain generation method for SC-FDMA implicitly includes M frequency-domain symbols S=[$s_0, s_1, \ldots s_{M-1}$] carried in M frequency-domain REs, where the frequency-domain symbol is a linear combination of M digital amplitude-phase modulation symbols D=[$d_0, d_1, \ldots d_{M-1}$] in the time domain. The time-domain generation method and frequency-domain generation method for SC-FDMA are equivalent.

For ensuring the channel estimation accuracy, a pilot enhancement design or another channel estimation method may usually be adopted in the related art. The pilot enhancement design includes that:

a pilot better matched with a channel characteristic is adopted;

more time-frequency resources are adopted to arrange more pilots; and when multiple users transmit data through the same time-frequency resource, the multiple users adopt pilots with low cross-correlations as much as possible to reduce mutual interference in the pilots.

If the multiple users transmit the data through the same time-frequency resource in a grant-free manner, different users randomly select pilots and may select the same pilot to cause a pilot collision. The pilot collision greatly influences the detection performance of the multiple users. For reducing the influence of the pilot collision, more pilots are usually required to be designed to reduce the collision probability, and more pilots usually means that more time-frequency resources may be occupied by the pilots and the pilot detection complexity is higher.

Embodiment 1

A network architecture in which the embodiment of the present application may be implemented includes a transmitting side and a receiving side. The transmitting side transmits data to the receiving side.

Figure 5:
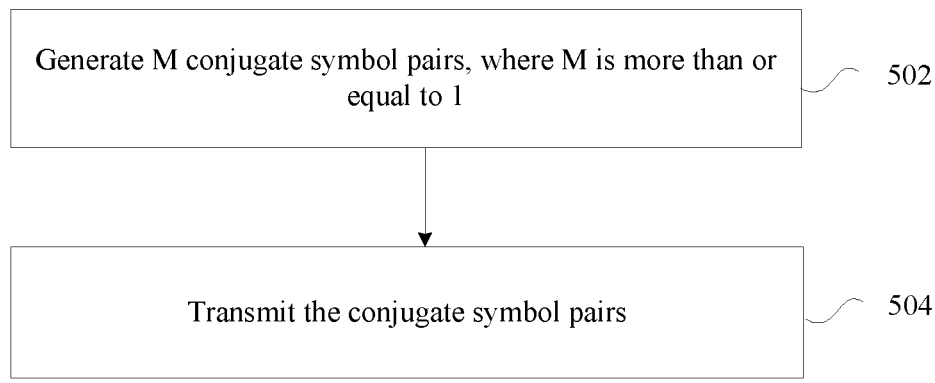
FIG. 5 is a flowchart of a data transmission control method according to an embodiment of the present disclosure.

The embodiment provides a data transmission method. FIG. 5 is a flowchart of a data transmission method according to an embodiment of the present disclosure. As shown in FIG. 5, the flow includes operation 502 and operation 504.

In operation 502, M conjugate symbol pairs are generated, where M is more than or equal to 1.

In operation 504, the conjugate symbol pairs are transmitted.

Through the operations, the M conjugate symbol pairs are transmitted, and then a receiver may perform channel estimation by use of the symbol pairs, so that the problems of time-frequency resource waste caused by transmitting a specific pilot symbol and inaccurate channel estimation caused by a pilot collision in the related art are solved, and the resource utilization rate is increased.

In an embodiment, an executor of the operations may be, but not limited to, a base station, a terminal or a transmitter, etc.

In an embodiment, the M conjugate symbol pairs include, but not limited to, the following symbol pairs: 1) M directly conjugate symbol pairs; 2) M negatively conjugate symbol pairs; 3) M weighted conjugate symbol pairs; 4) M symbol pairs including A directly conjugate symbol pairs and M-A negatively or weighted conjugate symbol pairs, where A is more than or equal to 1; 5) M symbol pairs including A negatively conjugate symbol pairs and M-A weighted conjugate symbol pairs, where A is more than or equal to 1; 6) M conjugate symbol pairs, obtained by weighting, by use of a weighted value or a weighted vector, one or two symbols in each symbol pair in M directly conjugate symbol pairs; and 7) M conjugate symbol pairs, obtained by weighting, by use of a weighted value or a weighted vector, one or more symbols in multiple symbol pairs in M directly conjugate symbol pairs.

Figure 6A:
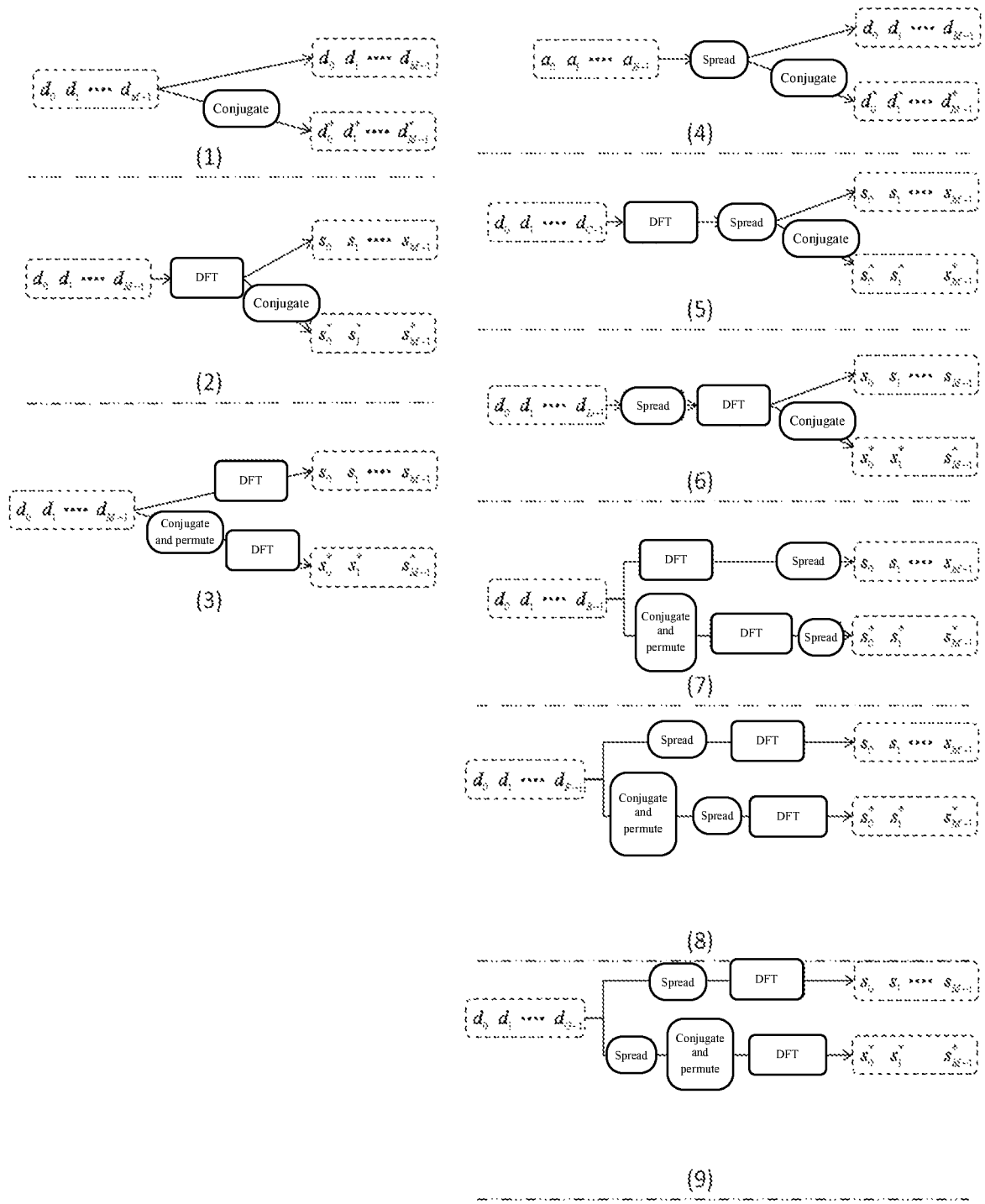
FIG. 6a is a schematic diagram of generating M conjugate symbol pairs according to an embodiment.

In an embodiment, the M conjugate symbol pairs may be generated in one of the following manners. FIG. 6a is a schematic diagram of generating M conjugate symbol pairs according to an embodiment. As shown in FIG. 6a, nine forms are illustrated:

(1) M modulation symbols and M symbols obtained by conjugating the M modulation symbols;

(2) M symbols obtained by performing DFT on M modulation symbols and M symbols obtained by conjugating the M symbols obtained by performing the DFT;

(3) M symbols obtained by performing DFT on M modulation symbols and M symbols obtained by performing DFT after conjugation and permutation of the M modulation symbols;

(4) M symbols obtained by performing spreading processing on B modulation symbols and M symbols obtained by conjugating the M symbols obtained by performing the spreading processing, where B is more than or equal to 1;

(5) M symbols obtained by performing DFT and spreading processing on C modulation symbols and M symbols obtained by conjugating the M symbols obtained by performing the DFT and the spreading processing, where C is more than or equal to 1;

(6) M symbols obtained by performing spreading processing and DFT on D modulation symbols and M symbols obtained by conjugating the M symbols obtained by performing the spreading processing and the DFT, where D is more than or equal to 1;

(7) M symbols obtained by performing DFT and spreading processing on E modulation symbols and M symbols obtained by performing DFT and spreading processing after conjugation and permutation of the E modulation symbols, where E is more than or equal to 1;

(8) M symbols obtained by performing spreading processing and DFT on F modulation symbols and M symbols obtained by performing spreading processing and DFT after conjugation and permutation of the F modulation symbols, where F is more than or equal to 1, and DFT refers to performing F-point DFT on every F modulation symbols or every F conjugated and permuted modulation symbols as a group; and (9) M symbols obtained by performing spreading processing and DFT on G modulation symbols and M symbols obtained by performing spreading processing, conjugation and permutation, and DFT on the G modulation symbols, where G is more than or equal to 1, permutation is performed on every G modulation symbols, and DFT refers to performing G-point DFT on every G modulation symbols or every G conjugated and permuted modulation symbols as a group.

Spreading processing refers to spreading the symbol by use of a spreading sequence. In an embodiment, spreading a symbol d by use of a spreading sequence $[c_0, c_1, \ldots c_{L-1}]$ with a length L refers to an operation of multiplying the symbol d by each element in the spreading sequence to generate L symbols $[d \cdot c_0, d \cdot c_1, \ldots d \cdot c_{L-1}]$.

For the conjugation and permutation in the embodiment, conjugation may be performed before permutation, or conjugation may be performed after permutation.

In the embodiment, the operation that W modulation symbols are conjugated and permuted includes that: the W modulation symbols $[d_0, d_1, \ldots d_{W-1}]$ are conjugated and permuted to a negative sequence to obtain W modulation symbols $[e_0, e_1, \ldots e_{W-1}]$, where $e_0 = d^*_0$, $e_k = d^*_{W-k}$ and $1 \leq k \leq W-1$; or, the W modulation symbols $[d_0, d_1, \ldots d_{W-1}]$ are conjugated and permuted to an opposite sequence to obtain the W modulation symbols $[d_0, d_1, \ldots d_{W-1}]$, where $e_k = d^*_{W-1-k}$ and $0 \leq k \leq W-1$. A value of W is equal to one of M, E, F and G.

Since a conjugate of a real number is the real number itself, for the condition that all the modulation symbols are real numbers, for example, BPSK modulation symbols are valued to be −1 or +1 only, the conjugation operation in the embodiment may be omitted. This is because the results obtained by conjugating the real numbers are still the real numbers.

In an embodiment, after the M conjugate symbol pairs are obtained, the method may further include one of the following operations:

1) one or two symbols in each conjugate symbol pair are weighted by use of a weighted value or a weighted vector to obtain M weighted conjugate symbol pairs; and 2) one or more symbols in multiple conjugate symbol pairs are weighted by use of a weighted value or a weighted vector to obtain M weighted conjugate symbol pairs.

In the embodiment, M modulation symbols include BPSK modulation symbols, π/2 shifted BPSK modulation symbols, QPSK modulation symbols or Quadrature Amplitude Modulation (QAM) symbols. If the M modulation symbols adopt π/2 shifted BPSK modulation, reduction in a PAPR/CM of a transmitted signal is facilitated better.

In an embodiment, after the M conjugate symbol pairs are obtained, spreading processing is performed on symbols of the conjugate symbol pairs by use of a spreading sequence; or, after the M weighted conjugate symbol pairs are obtained, spreading processing is performed on symbols of the conjugate symbol pairs by use of a spreading sequence.

In the embodiment, the spreading sequence is obtained in one of the following manners: 1) configuration by a system, 2) indication by a receiver of the symbol pairs, 3) independent selection by a transmitter of a sender of the symbol pairs, 4) independent generation by the transmitter of the sender of the symbol pairs, 5) random selection by the transmitter of the sender of the symbol pairs, 6) random generation by the transmitter of the sender of the symbol pairs, and 7) determination by the transmitter of the sender of the symbol pairs according to bits formed by performing Cyclic Redundancy Check (CRC) coding on information bits. That the spreading sequence is, by the transmitter of the sender, independently selected, independently generated, randomly selected or determined according to the bits formed by performing CRC coding on the information bits is a characteristic of grant-free access. In an embodiment, that the spreading sequence is determined according to the bits formed by performing CRC coding on the information bits is favorable for a process that the receiver in a grant-free access solution reconstructs bits that are correctly decoded and eliminates errors. Since all the bits in a CRC codeword are correct after correct decoding and the spreading sequence is determined by the bits of the CRC codeword, determination of the spreading sequence used by the transmitter of the sender may be facilitated.

In the embodiment, the weighted value or the weighted vector is obtained in one of the following manners: 1) configuration by a system, 2) indication by a receiver of the symbol pairs, 3) independent selection by a transmitter of a sender of the symbol pairs, 4) independent generation by the transmitter of the sender of the symbol pairs, 5) random selection by the transmitter of the sender of the symbol pairs, 6) random generation by the transmitter of the sender of the symbol pairs, and 7) determination by the transmitter of the sender of the symbol pairs according to the bits formed by performing CRC coding on the information bits. That the weighted value or the weighted vector is, by the transmitter of the sender, independently selected, independently generated, randomly selected or determined according to the bits formed by performing CRC coding on the information bits is a characteristic of grant-free access. In an embodiment, that the weighted value or the weighted vector is determined according to the bits formed by performing CRC coding on the information bits is favorable for the process that the receiver in the grant-free access solution reconstructs the bits that are correctly decoded and eliminates errors. Since all the bits in the CRC codeword are correct after correct decoding and the weighted value or the weighted vector is determined by the bits of the CRC codeword, determination of the weighted value or weighted vector used by the transmitter of the sender may be facilitated.

In an embodiment, the operation that the conjugate symbol pairs are transmitted includes that: the conjugate symbol pairs are carried by use of frequency-domain REs, where two REs respectively carry two symbols in one conjugate symbol pair, and the frequency-domain REs include one of: REs under multi-carrier OFDM modulation, REs under SC-FDMA modulation, and REs under single-carrier DFT-S-OFDM modulation.

In an embodiment, positions of the two REs carrying one conjugate symbol pair are adjacent or at an interval shorter than a predetermined symbol interval.

In the embodiment, under the condition that the REs are REs under multi-carrier OFDM modulation, the M conjugate symbol pairs include one of: 1) M modulation symbols and M symbols obtained by conjugating the M modulation symbols; and 2) M symbols obtained by performing spreading processing on the B modulation symbols and M symbols obtained by conjugating the M symbols obtained by performing the spreading processing, where B is more than or equal to 1.

Or, under the condition that the REs are REs under single-carrier DFT-S-OFDM modulation, the M conjugate symbol pairs include one of: 1) M symbols obtained by performing DFT on M modulation symbols and M symbols obtained by conjugating the M symbols obtained by performing the DFT; 2) M symbols obtained by performing DFT and spreading processing on the C modulation symbols and M symbols obtained by conjugating the M symbols obtained by performing the DFT and the spreading processing, where C is more than or equal to 1; and 3) M symbols obtained by performing spreading processing and DFT on the D modulation symbols and M symbols obtained by conjugating the M symbols obtained by performing the spreading processing and the DFT, where D is more than or equal to 1.

Or, under the condition that the REs are REs under single-carrier DFT-S-OFDM modulation or REs under SC-FDMA modulation, the M conjugate symbol pairs include one of: 1) M symbols obtained by performing DFT on M modulation symbols and M symbols obtained by performing DFT after conjugation and permutation of the M modulation symbols; 2) M symbols obtained by performing DFT and spreading processing on the E modulation symbols and M symbols obtained by performing DFT and spreading processing after conjugation and permutation of the E modulation symbols, where E is more than or equal to 1; 3) M symbols obtained by performing spreading processing and DFT on the F modulation symbols and M symbols obtained by performing spreading processing and DFT after conjugation and permutation of the F modulation symbols, where F is more than or equal to 1; and 4) M symbols obtained by performing spreading processing and DFT on the G modulation symbols and M symbols obtained by performing spreading processing, conjugation and permutation, and DFT on the G modulation symbols, where G is more than or equal to 1. Since a conjugate of a real number is the real number itself, for the condition that all the modulation symbols are real numbers, for example, BPSK modulation symbols valued to be −1 or +1 only, the conjugation operation in the embodiment may be omitted. This is because the conjugate of a real number is the real number itself.

In an embodiment, the operation that the conjugate symbol pairs are transmitted includes that: the conjugate symbol pairs are transmitted by use of one antenna of a transmitter. The transmitter may have one or more transmitting antennae. If the transmitter has multiple transmitting antennae, it may be applicable to use only one antenna for transmitting; alternatively, it may also be applicable to use multiple antennae for transmitting the same symbol respectively or use multiple antennae for transmitting versions, obtained by weighting through different weighted values, of the same symbol, respectively.

Figure 6B:
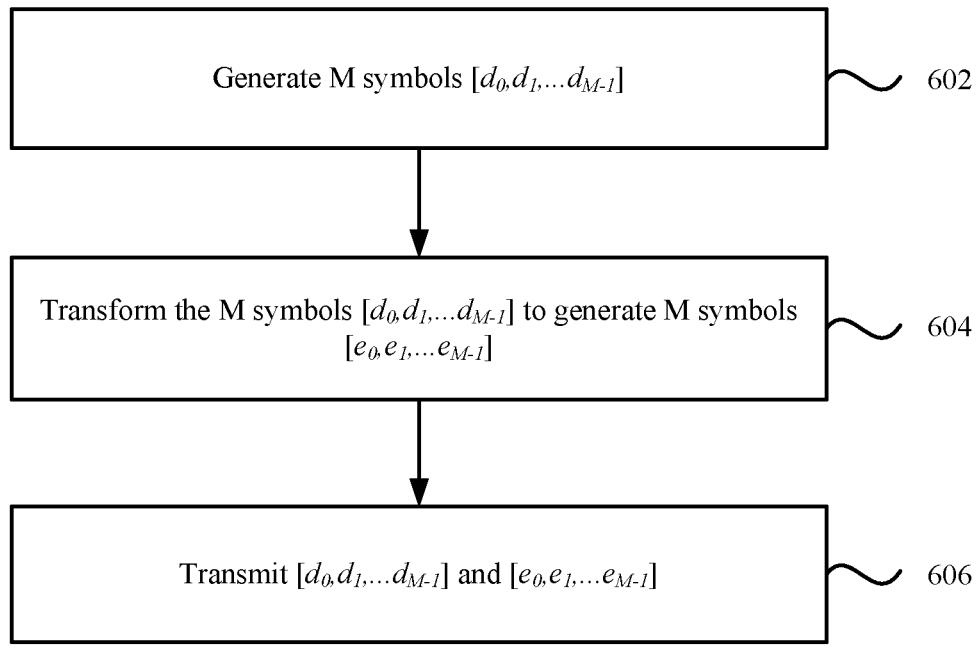
FIG. 6b is a flowchart of another data transmission control method according to an embodiment of the present disclosure.

On the transmitting side, the embodiment also provides another data transmission method. Referring to FIG. 6b, the flow includes the following operations.

In operation 602, M symbols $[d_0, d_1, \ldots d_{M-1}]$ are generated.

In operation 604, the M symbols $[d_0, d_1, \ldots d_{M-1}]$ are transformed to generate M symbols $[e_0, e_1, \ldots e_{M-1}]$.

In operation 606, $[d_0, d_1, \ldots d_{M-1}]$ and $[e_0, e_1, \ldots e_{M-1}]$ are transmitted, where M is more than or equal to 1.

In an embodiment, the operation that the M symbols $[d_0, d_1, \ldots d_{M-1}]$ are transformed to generate the M symbols $[e_0, e_1, \ldots e_{M-1}]$ includes one of the following operations:

1) the M symbols $[d_0, d_1, \ldots d_{M-1}]$ are conjugated and permuted or transposed to obtain the M symbols $[e_0, e_1, \ldots e_{M-1}]$;

2) the M symbols $[d_0, d_1, \ldots d_{M-1}]$ are conjugated and permuted to a negative sequence to obtain the M symbols $[e_0, e_1, \ldots e_{M-1}]$, $e_0 = d^*_0$, $e_k = d^*_{M-k}$ and $1 \leq k \leq M-1$;

3) the M symbols $[d_0, d_1, \ldots d_{M-1}]$ are conjugated and permuted to an opposite sequence to obtain the M symbols $[e_0, e_1, \ldots e_{M-1}]$, $e_k = d^*_{M-1-k}$ and $0 \leq k \leq M-1$; and 4) DFT, conjugation and IDFT are performed on the M symbols $[d_0, d_1, \ldots d_{M-1}]$ to obtain the M symbols $[e_0, e_1, \ldots e_{M-1}]$. The three actions (DFT, conjugation and IDFT) are merged to form a transform and can achieve the same effect as that achieved by conjugation and permutation to the negative sequence.

In an embodiment, the M symbols $[d_0, d_1, \ldots d_{M-1}]$ are M modulation symbols.

In an embodiment, the M modulation symbols include one of a BPSK modulation symbol, a π/2 shifted BPSK modulation symbol, a QPSK modulation symbol or a QAM symbol.

In an embodiment, the operation that $[d_0, d_1, \ldots d_{M-1}]$ and $[e_0, e_1, \ldots e_{M-1}]$ are transmitted includes one of the following operations:

1) $[d_0, d_1, \ldots d_{M-1}]$ and/or $[e_0, e_1, \ldots e_{M-1}]$ are/is transmitted after being multiplied by a specified value;

2) $[d_0, d_1, \ldots d_{M-1}]$ and/or $[e_0, e_1, \ldots e_{M-1}]$ are/is transmitted after being multiplied by a specified value and then respectively being subjected to spreading processing by use of a spreading sequence;

3) $[d_0, d_1, \ldots d_{M-1}]$ and $[e_0, e_1, \ldots e_{M-1}]$ are/is transmitted after respectively being subjected to spreading processing by use of a spreading sequence; and 4) spreading processing is performed on $[d_0, d_1, \ldots d_{M-1}]$ and $[e_0, e_1, \ldots e_{M-1}]$ by use of a spreading sequence respectively, and then symbols obtained after spreading of $[d_0, d_1, \ldots d_{M-1}]$ and/or symbols obtained after spreading of $[e_0, e_1, \ldots e_{M-1}]$ are multiplied by a specified value and then transmitted.

In the embodiment, the spreading sequence is obtained in one of the following manners: 1) configuration by a system, 2) indication by a receiver of symbol pairs, 3) independent selection by a transmitter of a sender of the symbol pairs, 4) independent generation by the transmitter of the sender of the symbol pairs, 5) random selection by the transmitter of the sender of the symbol pairs, 6) random generation by the transmitter of the sender of the symbol pairs and 7) determination by the transmitter of the sender of the symbol pairs according to bits formed by performing CRC coding on information bits. That the spreading sequence is, by the transmitter of the sender, independently selected, independently generated, randomly selected or determined according to the bits formed by performing CRC coding on the information bits is a characteristic of grant-free access. In an embodiment, that the spreading sequence is determined according to the bits formed by performing CRC coding on the information bits is favorable for a process that the receiver in a grant-free access solution reconstructs bits that are correctly decoded and eliminates errors. Since all the bits in a CRC codeword are correct after correct decoding and the spreading sequence is determined by the bits of the CRC codeword, determination of the spreading sequence used by the transmitter of the sender may be facilitated.

In the embodiment, the specified value is obtained in one of the following manners: 1) configuration by a system, 2) indication by a receiver of the symbol pairs, 3) independent selection by a transmitter of a sender of the symbol pairs, 4) independent generation by the transmitter of the sender of the symbol pairs, 5) random selection by the transmitter of the sender of the symbol pairs, 6) random generation by the transmitter of the sender of the symbol pairs, and 7) determination by the transmitter of the sender of the symbol pairs according to the bits formed by performing CRC coding on the information bits. That the specified value is, by the transmitter of the sender, independently selected, independently generated, randomly selected or determined according to the bits formed by performing CRC coding on the information bits is a characteristic of grant-free access. In an embodiment, that the specified value is determined according to the bits formed by performing CRC coding on the information bits is favorable for the process that the receiver in the grant-free access solution reconstructs the bits that are correctly decoded and eliminates errors. Since all the bits in the CRC codeword are correct after correct decoding and the specified value is determined by the bits of the CRC codeword, determination of the specified value used by the transmitter of the sender may be facilitated.

In an embodiment, the operation that $[d_0, d_1, \ldots d_{M-1}]$ and $[e_0, e_1, \ldots e_{M-1}]$ are transmitted includes that: $[d_0, d_1, \ldots d_{M-1}]$ and $[e_0, e_1, \ldots e_{M-1}]$ are transmitted in one of an SC-FDMA manner and a single-carrier DFT-S-OFDM manner.

Figure 7:
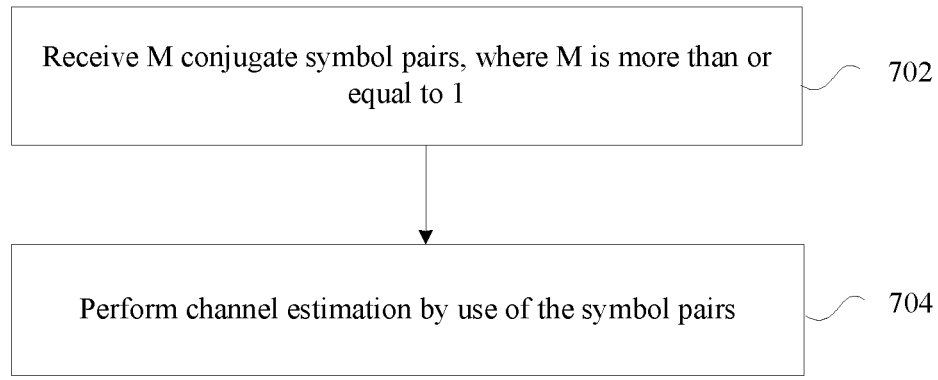
FIG. 7 is a flowchart of another data transmission control method according to an embodiment of the present disclosure.

The embodiment provides another data transmission method. FIG. 7 is a flowchart of another data transmission method according to an embodiment of the present disclosure. The flow is implemented on a receiving side corresponding to FIG. 5, FIG. 6a or FIG. 6b, and as shown in FIG. 7, includes operation 702 and operation 704.

In operation 702, M conjugate symbol pairs are received, where M is more than or equal to 1.

In operation 704, channel estimation is performed by use of the symbol pairs.

In an embodiment, the M conjugate symbol pairs are carried in 2M frequency-domain REs, the REs including one of: REs under multi-carrier OFDM modulation, REs under SC-FDMA modulation, and REs under single-carrier DFT-S-OFDM modulation.

In an embodiment, positions of two REs carrying a symbol pair are adjacent or at an interval shorter than a predetermined symbol interval.

In an embodiment, after the operation that channel estimation is performed by use of the symbol pairs, the method may further include the operation as follows. At least one of the following operations is executed by use of a channel estimation result of channel estimation: channel equalization, demodulation, decoding, and CRC. In the embodiment, the solution may further include the following operations. A first symbol and second symbol corresponding to two symbols of a symbol pair are acquired. The first symbol is multiplied by the second symbol to obtain a square of a channel estimation value, and a root extraction operation is executed on the square of the channel estimation value to obtain the channel estimation value and a negative value of the channel estimation value. After channel equalization is performed on the first symbol and the second symbol by use of the channel estimation value, respectively, two obtained equalization results are merged as a first equalization result. After channel equalization is performed on the first symbol and the second symbol by use of the negative value of the channel estimation value, respectively, two obtained equalization results are merged as a second equalization result. CRC is performed on results obtained by demodulating and decoding the first equalization result, and the second equalization result to determine whether the results are correctly decoded or not.

Through the above descriptions about the implementation modes, those skilled in the art may clearly know that the methods according to the abovementioned embodiments may be implemented in a manner of combining software and a universal hardware platform and, of course, may also be implemented through hardware. Based on such an understanding, the technical solution of the present disclosure substantially or parts making contributions to the related art may be embodied in the form of a software product. The computer software product is stored in a storage medium (for example, a Read-Only Memory (ROM)/Random Access Memory (RAM), a magnetic disk and an optical disk), including multiple instructions configured to enable a computer device (which may be a mobile phone, a computer, a server, a network device or the like) to execute the methods in one or more embodiments of the present disclosure.

Embodiment 2

The embodiment also provides a data transmission device, which is configured to implement the abovementioned embodiment. What has been described will not be elaborated. For example, term "module" used below may be a combination of software and/or hardware capable of realizing a preset function. Although the device described in the following embodiment may be implemented with software, implementation with hardware or a combination of the software and the hardware is also possible and conceivable.

Figure 8A:
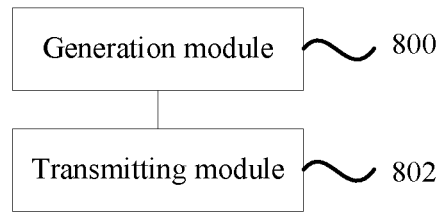
FIG. 8a is a structure block diagram of a data transmission device according to an embodiment of the present disclosure.

The embodiment provides a structure block diagram of a data transmission device. The device is applied to a sender, and as shown in FIG. 8a, includes:

a generation module 800, configured to generate M conjugate symbol pairs, where M is more than or equal to 1; and a transmitting module 802, configured to transmit the conjugate symbol pairs.

In an embodiment, the M conjugate symbol pairs include one of:

M directly conjugate symbol pairs;

M negatively conjugate symbol pairs;

M weighted conjugate symbol pairs;

M symbol pairs including A directly conjugate symbol pairs and M-A negatively or weighted conjugate symbol pairs, where A is more than or equal to 1;

M symbol pairs including A negatively conjugate symbol pairs and M-A weighted conjugate symbol pairs, where A is more than or equal to 1;

M conjugate symbol pairs, obtained by weighting, by use of a weighted value or a weighted vector, one or two symbols in each symbol pair in M directly conjugate symbol pairs; and M conjugate symbol pairs, obtained by weighting, by use of a weighted value or a weighted vector, one or more symbols in multiple symbol pairs in M directly conjugate symbol pairs.

In an embodiment, the M conjugate symbol pairs include one of:

M modulation symbols and M symbols obtained by conjugating the M modulation symbols;

M symbols obtained by performing DFT on M modulation symbols and M symbols obtained by conjugating the M symbols obtained by performing the DFT;

M symbols obtained by performing DFT on M modulation symbols and M symbols obtained by performing DFT after conjugation and permutation of the M modulation symbols;

M symbols obtained by performing spreading processing on B modulation symbols and M symbols obtained by conjugating the M symbols obtained by performing the spreading processing, where B is more than or equal to 1;

M symbols obtained by performing DFT and spreading processing on C modulation symbols and M symbols obtained by conjugating the M symbols obtained by performing the DFT and the spreading processing, where C is more than or equal to 1;

M symbols obtained by performing spreading processing and DFT on D modulation symbols and M symbols obtained by conjugating the M symbols obtained by performing the spreading processing and the DFT, where D is more than or equal to 1;

M symbols obtained by performing DFT and spreading processing on E modulation symbols and M symbols obtained by performing DFT and spreading processing after conjugation and permutation of the E modulation symbols, where E is more than or equal to 1;

M symbols obtained by performing spreading processing and DFT on F modulation symbols and M symbols obtained by performing spreading processing and DFT after conjugation and permutation of the F modulation symbols, where F is more than or equal to 1; and M symbols obtained by performing spreading processing and DFT on G modulation symbols and M symbols obtained by performing spreading processing, conjugation and permutation, and DFT on the G modulation symbols, where G is more than or equal to 1.

For the conjugation and permutation, the conjugation may be performed before the permutation, or the conjugation may be performed after the permutation. The spreading processing refers to spreading symbols by use of a spreading sequence.

Since a conjugate of a real number is the real number itself, for the condition that all the modulation symbols are real numbers, for example, BPSK modulation symbols valued to be −1 or +1 only, the conjugation operation in the embodiment may be omitted. This is because the conjugate of a real number is the real number itself.

Figure 8B:
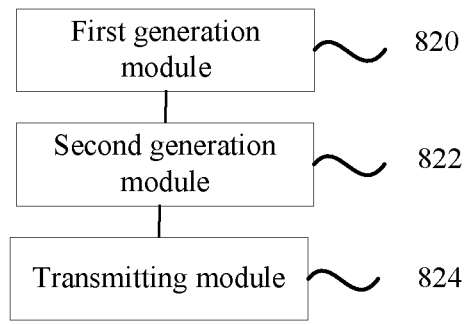
FIG. 8b is a structure block diagram of another data transmission device according to an embodiment of the present disclosure.

At the sender, the embodiment also provides another data transmission device. As shown in FIG. 8b, the device includes a first generation module 820, configured to generate M symbols $[d_0, d_1, \ldots d_{M-1}]$; a second generation module 822, configured to convert the M symbols $[d_0, d_1, \ldots d_{M-1}]$ to generate M symbols $[e_0, e_1, \ldots e_{M-1}]$; and a transmitting module 824, configured to transmit $[d_0, d_1, \ldots d_{M-1}]$ and $[e_0, e_1, \ldots e_{M-1}]$, where M is more than or equal to 1.

In an embodiment, the second generation module includes one of: a first generation unit, configured to conjugate and permute or transpose the M symbols $[d_0, d_1, \ldots d_{M-1}]$ to obtain the M symbols $[e_0, e_1, \ldots e_{M-1}]$; a second generation unit, configured to conjugate and transform the M symbols $[d_0, d_1, \ldots d_{M-1}]$ to a negative sequence to obtain the M symbols $[e_0, e_1, \ldots e_{M-1}]$, $e_0 = d^*_0$, $e_k = d^*_{M-k}$ and $1 \leq k \leq M-1$; a third generation unit, configured to conjugate and transform the M symbols $[d_0, d_1, \ldots d_{M-1}]$ to an opposite sequence to obtain the M symbols $[e_0, e_1, \ldots e_{M-1}]$, $e_k = d^*_{M-1-k}$ and $0 \leq k \leq M-1$; and a fourth generation unit, configured to perform DFT, conjugation and IDFT on the M symbols $[d_0, d_1, \ldots d_{M-1}]$ to obtain the M symbols $[e_0, e_1, \ldots e_{M-1}]$.

Figure 8C:
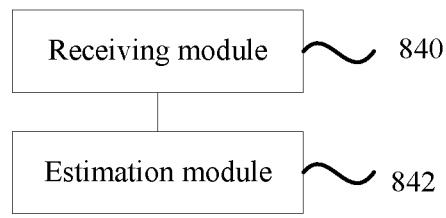
FIG. 8c is a structure block diagram of another data transmission device according to an embodiment of the present disclosure.

The embodiment provides a structure block diagram of another data transmission device. The device is applied to a receiver, and as shown in FIG. 8c, includes: a receiving module 840, configured to receive M conjugate symbol pairs, where M is more than or equal to 1; and an estimation module 842, configured to perform channel estimation by use of the symbol pairs.

In an embodiment, the device for the receiver may further include an execution module, configured to, after the estimation module performs channel estimation by use of the symbol pairs, execute at least one of the following operations by use of a channel estimation result of channel estimation: channel equalization, demodulation, decoding, and CRC.

Figure 8D:
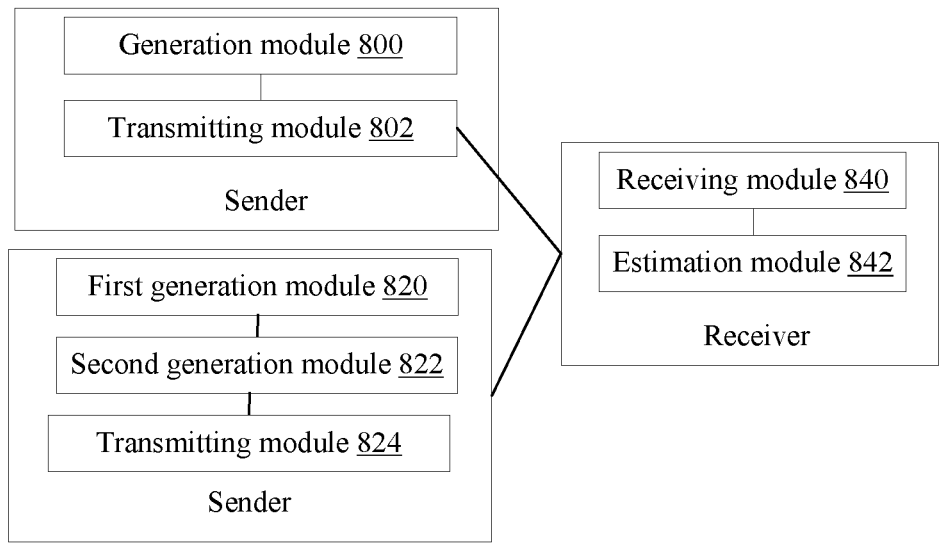
FIG. 8d is a structure block diagram of a data transmission system according to an embodiment of the present disclosure.

FIG. 8d is a structure block diagram of a data transmission system according to an embodiment of the present disclosure. As shown in FIG. 8d, the system includes at least one data transmission device for the sender (FIG. 8d illustrates a scenario of simultaneous connection with two senders) and a data transmission device for the receiver.

In an embodiment, the one or more modules may be implemented through software or hardware and, under the latter condition, may be implemented in, but not limited to, the following manner: the modules are all positioned in the same processor, or the one or more modules are positioned in different processors in any combination form, respectively.

Embodiment 3

In the embodiment, the present application is described according to optional embodiments of the present application and in combination with implementation modes and application scenarios.

In the embodiment, the solution of the embodiment is implemented based on the following characteristics: the effect generated by a channel over transmission symbols in a frequency domain is the conduction of "point multiplication" over transmission symbols. point multiplication channels in the frequency domain are strongly correlated in a coherence bandwidth and coherence time, and point multiplication channels experienced by symbols at adjacent or close time of the same or close subcarriers are substantially equal. Herein, "channel" refers to generalized channel and includes multipath, as well as time and frequency offsets caused by Doppler and other factors, and the frequency offset causes different phase rotations implemented by point multiplication over RE symbols at different moments.

On a transmitting side

Symbols carried in a multi-carrier OFDM or SC-FDMA/DFT-S-OFDM based frequency-domain subcarrier (or RE) may simultaneously include M conjugate symbol pairs, where M is more than or equal to 1.

Figure 9:
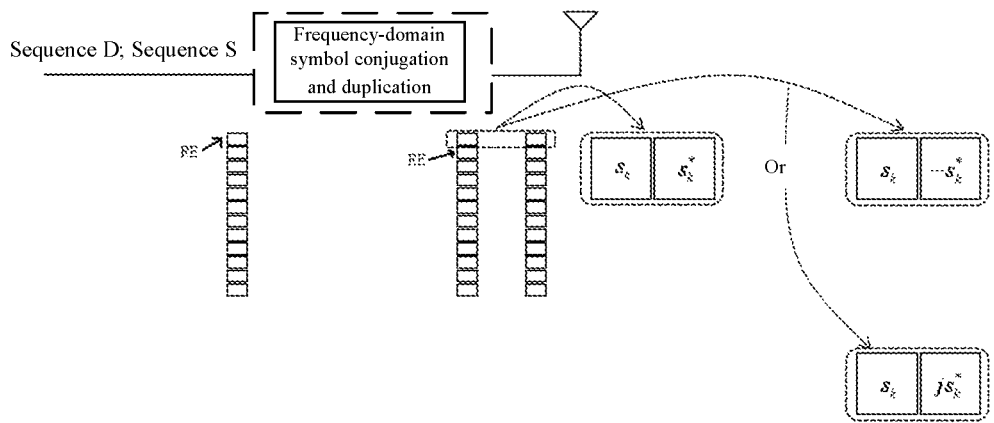
FIG. 9 is a schematic diagram of generating conjugate symbol pairs according to an embodiment of the present disclosure.

FIG. 9 is a schematic diagram of generating conjugate symbol pairs according to an embodiment. As shown in FIG. 9, each cell in the figure is REs under an OFDM/SC-FDMA/DFT-S-OFDM modulation technology, each RE carries a data symbol, and the symbols carried in two adjacent or close REs (cells) are conjugate or symbols generated by further processing over conjugate symbols, further processing including multiplication by a number or multiplication by a weighted value or phase rotation, etc. In FIG. 9, a kth subcarrier symbol in a symbol sequence $S=[s_0, s_1, \ldots s_{M-1}]$ of a digital amplitude-phase modulation symbol sequence $D=[d_0, d_1, \ldots d_{M-1}]$ on a frequency-domain subcarrier in the frequency domain is $s_k$. The figure includes a data symbol $s_k$ and $s^*_k$ obtained by conjugating the data symbol $s_k$ after duplication; or, the data symbol $s_k$ and a symbol $-s^*_k$ obtained by conjugating the data symbol $s_k$ after duplication and then multiplying a conjugate by minus one; or, the data symbol $s_k$ and a symbol $js^*_k$ obtained by conjugating the data symbol $s_k$ after duplication and then multiplying the conjugate by j. Herein, $s_k$ and $s^*_k$ are directly conjugate, $s_k$ and $-s^*_k$ are negatively conjugate, and $s_k$ and $js^*_k$ are weighted conjugate. In an embodiment, the data symbol $s_k$ is duplicated for conjugation and the conjugate is multiplied by j, $j=\text{sqrt}(-1)$, sqrt( ) representing square root calculation and j representing a weighted value. If the OFDM modulation technology is adopted, $S=D$; and if the DFT-S-OFDM modulation technology is adopted, $S=\text{DFT}(D)$, namely a relationship between S and D is that S is obtained by performing DFT on D.

Figure 10:
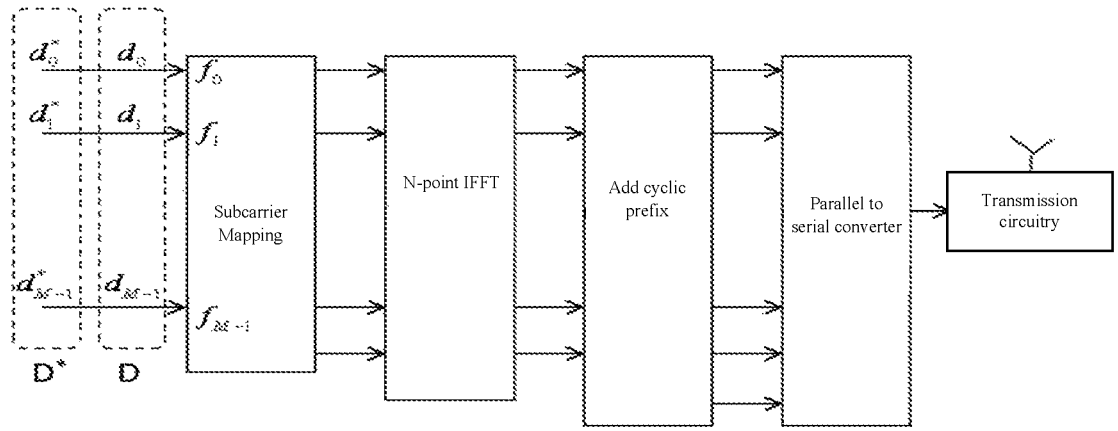
FIG. 10 is a schematic diagram of conjugation for multi-carrier OFDM modulation according to an embodiment of the present disclosure.

The method of the embodiment may be simply and directly applied to multi-carrier OFDM only by duplicating a digital amplitude-phase modulation symbol in an RE and then performing conjugation. In an embodiment, $D=[d_0, d_1, \ldots d_{M-1}]$ and $D^*=[d_0, d_1, \ldots d_{M-1}]^*=[d^*_0, d^*_1, \ldots d^*_{M-1}]$ may be carried on subcarriers of two adjacent OFDM symbols including M subcarriers, respectively. Herein, conjugating the symbol block D means conjugating each element in the symbol block. FIG. 10 is a schematic diagram of conjugation for multi-carrier OFDM modulation according to an embodiment, as shown in FIG. 10. In FIG. 10, D and D* are directly mapped to M subcarriers of two adjacent or close multi-carrier OFDM symbols, and D and D* may adopt different sequences, or in other words, D and D* may be subjected to permutation.

In an embodiment, the method of the embodiment may be applied to SC-FDMA/DFT-S-OFDM because a low PAPR/CM of a transmitted signal may be ensured and reduction in the cost of a transmitter and enlargement of coverage are facilitated.

However, in a single-carrier DFT-S-OFDM/SC-FDMA symbol, a digital amplitude-phase modulation symbol is carried in a time domain rather than directly carried in a frequency-domain subcarrier, so that only duplicating and conjugating the digital amplitude-phase modulation symbol in the time domain may not ensure a duplicate conjugate relationship in the frequency-domain subcarrier. Therefore, if a conjugation method for DFT-S-OFDM-SC-FDMA, processing on the transmitting side is slightly more complex than multi-carrier OFDM.

Figure 11:
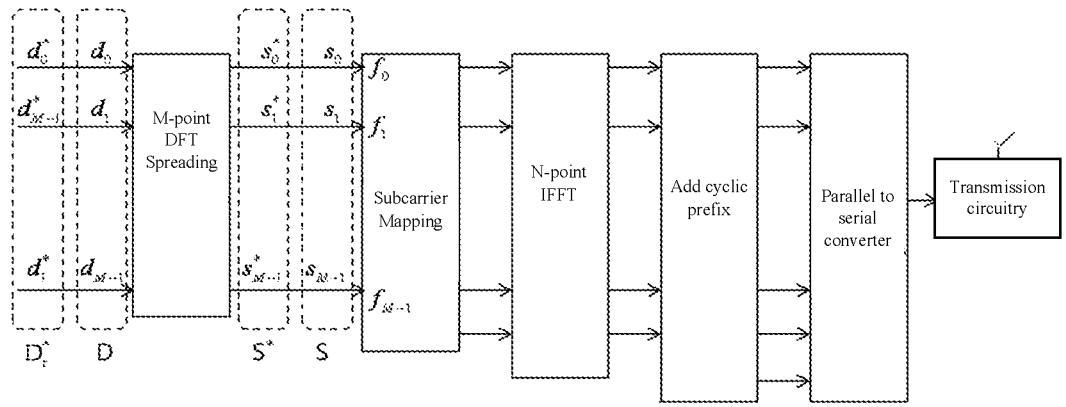
FIG. 11 is a schematic diagram of a conjugate symbol pair generation method based on a Discrete Fourier Transform-Spread-OFDM (DFT-S-OFDM) time-domain generation method according to an embodiment of the present disclosure.

For a frequency-domain generation method for SC-FDMA, i.e., DFT-S-OFDM, because frequency-domain symbols carried in a frequency-domain subcarrier/frequency-domain RE may be explicitly generated in a signal generation process of the frequency-domain generation method, like multi-carrier OFDM, the symbols in the frequency-domain subcarrier may be directly duplicated for conjugation, namely frequency-domain symbols S generated by performing DFT on "time-domain modulation symbols D" may be directly conjugated. As shown in FIG. 11, FIG. 11 is a schematic diagram of a conjugate symbol pair generation method based on a DFT-S-OFDM time-domain generation method according to an embodiment. In FIG. 11, S and S* are generated by a DFT-S-OFDM based conjugate symbol pair generation method 1, S and S* are transmitted through adjacent or close symbols, and S and S* are carried in the frequency domain. D and $D^*_r$ are generated by a DFT-S-OFDM based conjugate symbol pair generation method 2, D and $D^*_r$ are transmitted through adjacent or close symbols, and D and $D^*_r$ are carried in the frequency domain. Herein, $D^*_r=[d^*_0, d^*_1, \ldots d^*_{M-1}]$, namely $D^*_r$ is a symbol sequence generated after operations of "conjugation and permutation to a negative sequence" are executed on D.

Another method for generating a conjugate symbol pair in a frequency-domain subcarrier/frequency-domain RE is that M digital amplitude-phase modulation symbols $D=[d_0, d_1, \ldots d_{M-1}]$ in the time domain are conjugated and then permuted to another specific sequence to generate E, or equivalently, D is permuted to another specific sequence, then conjugation is performed to generate E and DFT is performed on E. Then, M symbols obtained by DFT(D) and M symbols obtained by DFT(E) may form M conjugate symbol pairs.

Herein, DFT( ) refers to a DFT-spread function or a DFT-spread function/operation. An accurate operation rule for DFT may be represented with a matrix operation. A matrix operation rule of a most common M-point DFT function or operation S=DFT(D) is the following matrix operation:

$$\begin{bmatrix} s_0 \\ s_1 \\ \vdots \\ s_{M-1} \end{bmatrix} = \frac{1}{\sqrt{M}} \begin{bmatrix} 1 & 1 & \ldots & 1 \\ 1 & e^{j\frac{2\pi}{M}} & \ldots & e^{j\frac{2\pi}{M}(M-1)} \\ \vdots & \vdots & e^{j\frac{2\pi}{M}nm} & \vdots \\ 1 & e^{j\frac{2\pi}{M}(M-1)} & \ldots & e^{j\frac{2\pi}{M}(M-1)(M-1)} \end{bmatrix} \begin{bmatrix} d_0 \\ d_1 \\ \vdots \\ d_{M-1} \end{bmatrix},$$

namely $S = QD$, where $$Q = \frac{1}{\sqrt{M}} \begin{bmatrix} 1 & 1 & \ldots & 1 \\ 1 & e^{j\frac{2\pi}{M}} & \ldots & e^{j\frac{2\pi}{M}(M-1)} \\ \vdots & \vdots & e^{j\frac{2\pi}{M}nm} & \vdots \\ 1 & e^{j\frac{2\pi}{M}(M-1)} & \ldots & e^{j\frac{2\pi}{M}(M-1)(M-1)} \end{bmatrix}$$

is a transform matrix for such $M$-point $DFT$.

Q is an M×M matrix, i.e., a square matrix with M rows and M columns. Row indexes from 1 to M, and column indexes from 1 to M. An element in an (n+1)th row and an (m+1)th column is $$e^{j\frac{2\pi}{M}nm},$$

$M>m \geq 0$ and $M>n \geq 0$.

A Q matrix involved in a matrix operation rule of another common M-point DFT function or operation S=DFT(D) is as follows:

$$Q = \frac{1}{\sqrt{M}} \begin{bmatrix} 1 & 1 & \ldots & 1 \\ 1 & e^{-j\frac{2\pi}{M}} & \ldots & e^{-j\frac{2\pi}{M}(M-1)} \\ \vdots & \vdots & e^{-j\frac{2\pi}{M}nm} & \vdots \\ 1 & e^{-j\frac{2\pi}{M}(M-1)} & \ldots & e^{-j\frac{2\pi}{M}(M-1)(M-1)} \end{bmatrix},$$

where an element in an (n+1)th row and an (m+1)th column is $$e^{-j\frac{2\pi}{M}nm},$$

$M>m \geq 0$ and $M>n \geq 0$

In the document of the embodiment, if being involved in a matrix operation, $D=[d_0, d_1, \ldots d_{M-1}]$ or the M symbols formed after conjugation and permutation of D, for example, M symbols $D^*_r=[d^*_0, d^*_1, \ldots d^*_{M-1}]$ formed after conjugation and permutation to the negative sequence, are automatically transformed to column vectors. That is, if D is involved in the matrix operation, $D=[d_0, d_1, \ldots d_{M-1}]^T$. Herein, T refers to a transposition operation.

If DFT is the abovementioned matrix operation, the time-domain symbol D may be conjugated and permuted to the negative sequence at first. Herein, a symbol sequence formed after the time-domain symbol $D=[d_0, d_1, \ldots d_{M-1}]$ is conjugated and permuted to the negative sequence is $D^*_r=[d^*_0, d^*_1, \ldots d^*_{M-1}]$. In such a manner, it may be ensured that 2M frequency-domain symbols including DFT(D) and $DFT(D^*_r)$ include M conjugate symbol pairs, or more specifically, symbols of S=QD and $S^*=QD^*_r$ are conjugate, namely:

$$\begin{bmatrix} s^*_0 \\ s^*_1 \\ \vdots \\ s^*_{M-1} \end{bmatrix} = \frac{1}{\sqrt{M}} \begin{bmatrix} 1 & 1 & \ldots & 1 \\ 1 & e^{j\frac{2\pi}{M}} & \ldots & e^{j\frac{2\pi}{M}(M-1)} \\ \vdots & \vdots & e^{j\frac{2\pi}{M}nm} & \vdots \\ 1 & e^{j\frac{2\pi}{M}(M-1)} & \ldots & e^{j\frac{2\pi}{M}(M-1)(M-1)} \end{bmatrix} \begin{bmatrix} d^*_0 \\ d^*_{M-1} \\ d^*_{M-2} \\ \vdots \\ d^*_2 \\ d^*_1 \end{bmatrix}.$$

Figure 12:
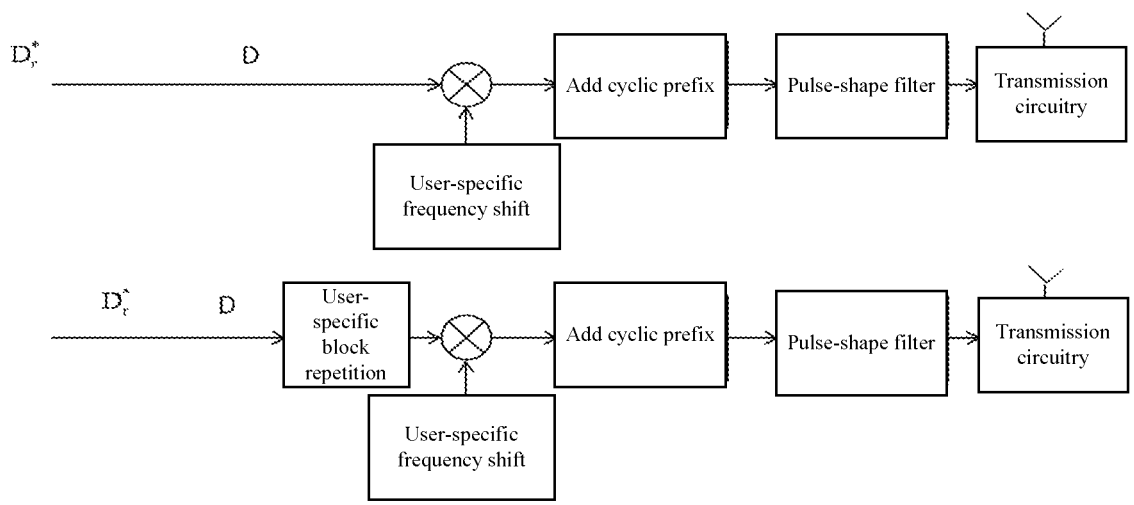
FIG. 12 is a schematic diagram of a conjugate symbol pair generation method based on an SC-FDMA time-domain generation method according to an embodiment of the present disclosure.

The method of conjugating and permuting the "time-domain symbol" to the negative sequence is applicable to both the DFT-S-OFDM frequency-domain generation method and time-domain generation method for SC-FDMA, as shown in FIG. 11 and FIG. 12. FIG. 12 is a schematic diagram of a conjugate symbol pair generation method based on an SC-FDMA time-domain generation method according to an embodiment. However, the method is more applicable to the time-domain generation method because the generation process is simpler and more direct, as shown in FIG. 12. For the DFT-S-FOFDM time-domain generation method, the method of conjugating the "time-domain symbol" and permuting the "time-domain symbol" to the negative sequence requires one more DFT operation, compared with the method of directly conjugating the frequency-domain symbol, as shown in FIG. 11.

A more general theory of the method of conjugation and permutation to the negative sequence is that assuming $D^*_r(t)=D^*(-t)$, namely $D^*_r$ is an operation of conjugating D and permuting D to a negative sequence, then corresponding symbols of DFT(D(t)) and $DFT(D^*(-t))=DFT(D^*_r(t))$ are conjugate.

In FIG. 12, $D=[d_0, d_1, \ldots d_{M-1}]$ are digital amplitude-phase modulation symbols, $D^*_r=[d^*_0, d^*_1, \ldots d^*_{M-1}]$ is a symbol sequence generated after the operations of "conjugation and permutation to the negative sequence" are executed on D, and D and $D^*_r$ are modulated to (be carried in) two adjacent or close SC-FDMA symbols, or D and $D^*_r$ are transmitted through two adjacent or close SC-FDMA symbols.

The time-domain symbol D may also be conjugated and permuted to an opposite sequence at first. Herein, a symbol sequence formed after the time-domain symbol $D=[d_0,$ $d_1, \ldots d_{M-1}]$ is conjugated and permuted to the opposite sequence is $D^*_n=[d^*_{M-1},d^*_{M-2}\ldots,d^*_2,d^*_1,d^*_0]$. In such a manner, it may be ensured that 2M frequency-domain symbols including DFT(D) and DFT($D^*_n$) are in the following relationship:

$$\begin{bmatrix} s_0^* \\ e^{-j\frac{2\pi}{M}}s_1^* \\ e^{-j\frac{2\pi}{M}2}s_2^* \\ \vdots \\ e^{-j\frac{2\pi}{M}(M-2)}s_{M-2}^* \\ e^{-j\frac{2\pi}{M}(M-1)}s_{M-1}^* \end{bmatrix} =$$

$$\frac{1}{\sqrt{M}}\begin{bmatrix} 1 & 1 & \ldots & 1 \\ 1 & e^{j\frac{2\pi}{M}} & \ldots & e^{j\frac{2\pi}{M}(M-1)} \\ \vdots & \vdots & e^{j\frac{2\pi}{M}nm} & \vdots \\ 1 & e^{j\frac{2\pi}{M}(M-1)} & \ldots & e^{j\frac{2\pi}{M}(M-1)(M-1)} \end{bmatrix} \begin{bmatrix} d_{M-1}^* \\ d_{M-2}^* \\ d_{M-3}^* \\ \vdots \\ d_1^* \\ d_0^* \end{bmatrix}$$

Or, if Q is defined in another manner, the 2M frequency-domain symbols including DFT(D) and DFT($D^*_n$) are in the following relationship:

$$\begin{bmatrix} s_0^* \\ e^{j\frac{2\pi}{M}}s_1^* \\ e^{j\frac{2\pi}{M}2}s_2^* \\ \vdots \\ e^{j\frac{2\pi}{M}(M-2)}s_{M-2}^* \\ e^{j\frac{2\pi}{M}(M-1)}s_{M-1}^* \end{bmatrix} =$$

$$\frac{1}{\sqrt{M}}\begin{bmatrix} 1 & 1 & \ldots & 1 \\ 1 & e^{-j\frac{2\pi}{M}} & \ldots & e^{-j\frac{2\pi}{M}(M-1)} \\ \vdots & \vdots & e^{-j\frac{2\pi}{M}nm} & \vdots \\ 1 & e^{-j\frac{2\pi}{M}(M-1)} & \ldots & e^{-j\frac{2\pi}{M}(M-1)(M-1)} \end{bmatrix} \begin{bmatrix} d_{M-1}^* \\ d_{M-2}^* \\ d_{M-3}^* \\ \vdots \\ d_1^* \\ d_0^* \end{bmatrix}.$$

It can be seen that DFT(D) and DFT($D^*_n$) are conjugate to a certain extent, although not directly conjugate.

In fact, $D^*_n=[d^*_{M-1},d^*_{M-2}\ldots,d^*_2,d^*_1,d^*_0]$ may also be considered to be obtained by cyclically shifting $D^*_r=[d^*_0, d^*_1, \ldots, d^*_1]$ to the left by one bit. Therefore, after DFT is performed on a symbol block $D^*_{r\_cs}$ generated by cyclically shifting $D^*_r=[d^*_0,d^*_1, \ldots, d^*_1]$ by any number of bits, DFT($D^*_{r\_cs}$) and DFT(D) are conjugate to a certain extent, although not directly conjugate. Therefore, this solution also falls within the content of the present patent. Herein, cyclic shift includes cyclic left shift or cyclic right shift.

Since a conjugate of a real number is the real number itself, for the condition that all the modulation symbols are real numbers, for example, BPSK modulation symbols valued to be −1 or +1 only, the conjugation operation in the embodiment may be omitted. This is because the conjugate of a real number is the real number itself.

In an embodiment, the method of the embodiment may be combined with "DFT-S-OFDM/SC-FDMA applying π/2-BPSK (pi/2-BPSK) modulation". DFT-S-OFDM/SC-FDMA applying π/2-BPSK (pi/2-BPSK) modulation usually has a lower PAPR/CM and is more favorable for uplink transmission. The following possible variations are included.

Of course, a conjugate data symbol may further be prefixed with a "minus" or multiplied by a number. In fact, prefixing with the "minus" is equivalent to multiplication by −1, and is a particular case of multiplication by a number. Multiplication by a number may be multiplication by another number, for example, [j,-j, exp(j*pi/4), exp(j*pi/3), etc.]. If a symbol has multiple duplicate conjugate versions, different conjugate versions may be multiplied by different numbers. For example, the first duplicate conjugate version is multiplied by −1, the second duplicate conjugate is multiplied by i and the third duplicate conjugate is multiplied by −i.

Different weighted values are favorable for inter-user interference suppression under two conditions of "channel estimation" and "data merging after equalization", so that the channel estimation accuracy and an SNR of a merged symbol obtained by data merging after equalization may be improved.

For example, if two symbols of each conjugate symbol pair of a user 1 are weighted by [1, 1] respectively, namely $[s_{1k},s_{1k}]$, and two symbols of each conjugate symbol pair of a user 2 are weighted by [1, −1] respectively, namely $[s_{2k},-s^*_{2k}]$, for an Additive White Gaussian Noise (AWGN) channel, received symbols corresponding to a kth conjugate symbol pair are $y_{ak}=s_{1k}+s_{2k}+n_{ak}$ and $y_{bk}=s^*_{1k}-s_{2k}+n_{bk}$ respectively.

Inverse conjugation and merging are performed on each conjugate symbol pair, and the symbols are correspondingly processed according to weighting factors and then merged. Since there are two weighting factors, there are correspondingly two merging manners, namely $y_{ak}+(y_{bk})^*$ for weighting by [1, 1] for the user 1 and $y_{ak}-(y_{bk})^*$ for weighting by [1, −1], specifically as follows:

$$y_{ak} + (y_{bk})^* = s_{1k} + s_{2k} + n_{ak} + (s_{1k}^* - s_{2k}^* + n_{bk})^* =$$
$$s_{1k} + s_{2k} + n_{ak} + s_{1k} - s_{2k} + n_{bk}^* = 2s_{1k} + n_{ak} + n_{bk}^*$$

and $$y_{ak} - (y_{bk})^* = s_{1k} + s_{2k} + n_{ak} - (s_{1k}^* - s_{2k}^* + n_{bk})^* =$$
$$s_{1k} + s_{2k} + n_{ak} - s_{1k} + s_{2k} - n_{bk}^* = 2s_{2k} + n_{ak} - n_{bk}^*.$$

It can be seen that different weighted values are favorable for "merging of conjugate symbol pairs after equalization", namely inter-user interference is suppressed by different weighted merging, so that the SNR of the merged symbol obtained by data merging after equalization may be improved.

For a flat fading channel, point multiplication by a complex number is performed in the frequency domain:

$$y_{ak} = H_1 s_{1k} + H_2 s_{2k} + n_{ak}$$

$$y_{bk} = H_1 s_{1k}^* - H_2 s_{2k}^* + n_{bk}$$

$$y_{ak} + (y_{bk})^* = H_1 s_{1k} + H_2 s_{2k} + n_{ak} + (H_1 s_{1k}^* - H_2 s_{2k}^* + n_{bk})^* =$$

-continued $$H_1 s_{1k} + H_2 s_{2k} + n_{ak} + H_1^* s_{1k} - H_2^* s_{2k} + n_{bk}^* =$$

$$(H_1 + H_1^*)s_{1k} + (H_2 - H_2^*)s_{2k} + n_{ak} + n_{bk}^*$$

$$y_{ak} - (y_{bk})^* = H_1 s_{1k} + H_2 s_{2k} + n_{ak} - (H_1 s_{1k}^* - H_2 s_{2k}^* + n_{bk})^* =$$

$$H_1 s_{1k} + H_2 s_{2k} + n_{ak} - H_1^* s_{1k} + H_2^* s_{2k} - n_{bk}^* =$$

$$(H_1 - H_1^*)s_{1k} + (H_2 + H_2^*)s_{2k} + n_{ak} - n_{bk}^*.$$

It can be seen that, since "orthogonal" weighting is adopted for the two users, namely weighting by [+1, +1] is adopted for one user and weighting by [+1, −1] is adopted for the other user, after each weighted merging manner is executed, the interference of a user may be eliminated, thereby improving the SNR of the merged symbol. It can be seen that such merging is favorable for improving the SNR of the merged symbol.

The channel estimation accuracy is improved by different weighted values as follows. M conjugate symbol pairs are generated, for example, four symbols generated by prefixing one symbol in four symbols of every two directly conjugate symbol pairs $[s_{2k+1}, s^*_{2k+1}, s_{2k+2}, s^*_{2k+2}]$ with a minus, for example, every two conjugate symbol pairs are weighted to obtain $[s_{2k+1}, s^*_{2k+1}, s_{2k+2}, -s^*_{2k+2}]$ or $[s_{2k+1}, -s^*_{2k+1}, s_{2k+2}, s^*_{2k+2}]$, or $[s_{2k+1}, s^*_{2k+1}, -s_{2k+2}, s^*_{2k+2}]$ or $[-s_{2k+1}, s^*_{2k+1}, s_{2k+2}, s^*_{2k+2}]$, and M symbol pairs including directly conjugate symbol pairs and also including negatively conjugate symbol pairs, obtained by processing, are transmitted. For example, the user 1 uses $[s_{2k+1}, s^*_{2k+1}, s_{2k+2}, s^*_{2k+2}]$ and the user 2 uses $[s_{2k+1}, s^*_{2k+1}, s_{2k+2}, -s^*_{2k+2}]$ In such case, a channel estimation process is as follows:

$$y_{ak} y_{bk} = (H_1 s_{1,2k+1} + H_2 s_{2,2k+1} + n_{ak})(H_1 s^*_{1,2k+1} + H_2 s^*_{2,2k+1} + n_{bk}) =$$

$$H_1^2 |s_{1,2k+1}|^2 + H_2^2 |s_{2,2k+1}|^2 +$$

$$H_1 s_{1,2k+1} H_2 s^*_{2,2k+1} + H_2 s_{2,2k+1} H_1 s^*_{1,2k+1} + \hat{n}_1$$

$$y_{ck} y_{dk} = (H_1 s_{1,2k+2} + H_2 s_{2,2k+2} + n_{ak})(H_1 s^*_{1,2k+2} - H_2 s^*_{2,2k+2} + n_{bk}) =$$

$$H_1^2 |s_{1,2k+2}|^2 - H_2^2 |s_{2,2k+2}|^2 -$$

$$H_1 s_{1,2k+2} H_2 s^*_{2,2k+2} + H_2 s_{2,2k+2} H_1 s^*_{1,2k+2} + \hat{n}_2,$$

then $$y_{ak} y_{bk} + y_{ck} y_{dk} = H_1^2 |s_{1,2k+1}|^2 + H_2^2 |s_{2,2k+1}|^2 +$$

$$H_1 s_{1,2k+1} H_2 s^*_{2,2k+1} + H_2 s_{2,2k+1} H_1 s^*_{1,2k+1} + \hat{n}_1 + H_1^2 |s_{1,2k+2}|^2 -$$

$$H_2^2 |s_{2,2k+2}|^2 - H_1 s_{1,2k+2} H_2 s^*_{2,2k+2} + H_2 s_{2,2k+2} H_1 s^*_{1,2k+2} + \hat{n}_2$$

$$y_{ak} y_{bk} - y_{ck} y_{dk} = H_1^2 |s_{1,2k+1}|^2 + H_2^2 |s_{2,2k+1}|^2 + H_1 s_{1,2k+1} H_2 s^*_{2,2k+1} +$$

$$H_2 s_{2,2k+1} H_1 s^*_{1,2k+1} + \hat{n}_1 - H_1^2 |s_{1,2k+2}|^2 + H_2^2 |s_{2,2k+2}|^2 +$$

$$H_1 s_{1,2k+2} H_2 s^*_{2,2k+2} - H_2 s_{2,2k+2} H_1 s^*_{1,2k+2} - \hat{n}_2.$$

In such a manner, symbols like $y_{ak}y_{bk}+y_{ck}y_{dk}$ are added to obtain an estimate of $H_1^2$ and substantially eliminate the interference of $H_2^2$, and symbols like $y_{ak}y_{bk}-y_{ck}y_{dk}$ are added to obtain an estimate of $H_2^2 H_1^2$ and substantially eliminate the interference of $H_1^2$.

For a grant-based system, a base station may assign different weighted values for different users.

For a grant-free access system, multiple weighting manners may be defined, for example, two different weighting manners are defined, and a terminal randomly selects one of them. For example, one of the following weights may be randomly selected for a conjugate symbol pair of the user:

1: all the symbols in $[s_{2k+1}, s^*_{2k+1}, s_{2k+2}, s^*_{2k+2}]$ . . . are positive and prefixed with no "minus"; and 2: a conjugate weight for one symbol pair in every two conjugate symbol pairs in $[s_{2k+1}, s^*_{2k+1}, s_{2k+2}, -s^*_{2k+2}]$ . . . is "−1".

In case of random selection, different manners may be selected for different users, which is favorable for subsequent channel estimation and merging.

The weight selected by the user is required to be known during reconstruction, which requires weight information selected by the user to be included in "codeword bits formed by performing CRC coding on information bits". In an embodiment, two inclusion manners or weight determination manners may be adopted.

One bit in the codeword bits formed by performing CRC coding on the information bits may be adopted to determine the specific weight to be selected. For example, if the bit is 0, the first weight is selected, and if the bit is 1, the second weight is selected.

A certain operation is executed on the codeword bits formed by performing CRC coding on the information bits to generate a bit, if the bit is 0, the first weight is selected, and if the bit is 1, the second weight is selected.

In case of different transmission, different bits may be adopted to indicate the weight to improve the randomness.

Figure 13:
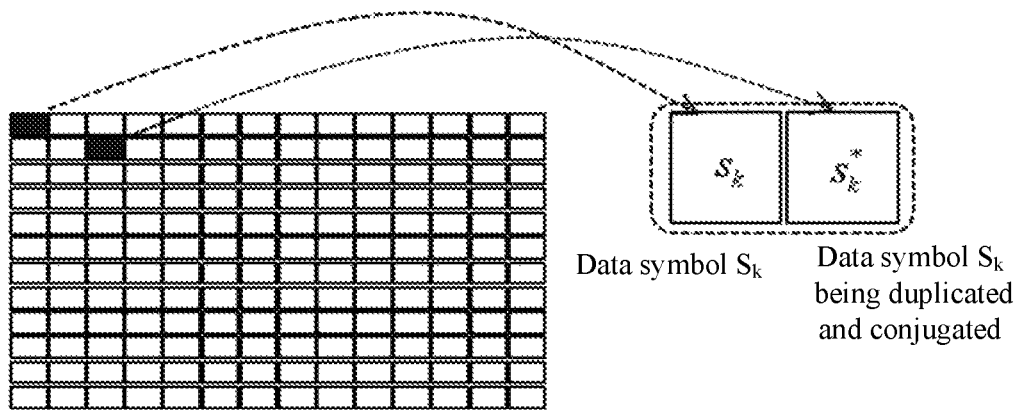
FIG. 13 is a schematic diagram of positions of a conjugate symbol pair according to an embodiment of the present disclosure.

A pair of conjugate symbols are not in adjacent REs, for example, spaced by several REs, and even not in the same subcarrier. FIG. 13 is a schematic diagram of positions of a conjugate symbol pair according to an embodiment, as shown in FIG. 13.

Figure 14:
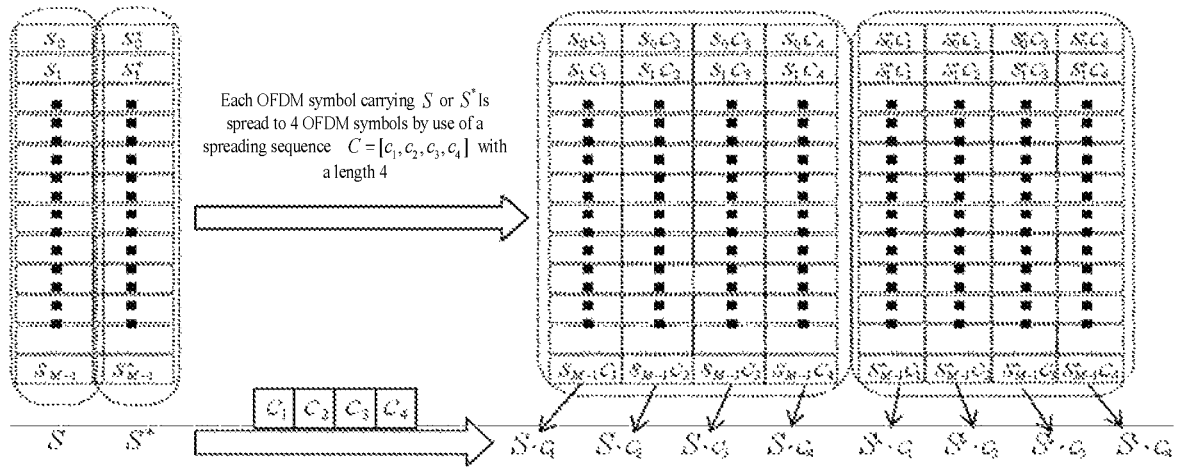
FIG. 14 is a schematic diagram of spreading after duplication and conjugation according to an embodiment of the present disclosure.

A spreading technology is applied to a "conjugate symbol pair", namely a data symbol and a conjugate symbol are spread by a spreading sequence. FIG. 14 is a schematic diagram of spreading after duplication and conjugation according to an embodiment, as shown in FIG. 14. By conjugation+spreading, the receiver may suppress the inter-user interference by symbol spreading, namely the receiver performs sequence despreading at first. In an embodiment, sequence despreading may be Matched Filter-Despreading (MF-Despreading), ZeroForcing-Despreading (ZF-Despreading) and Minimum Mean Square Error-Despreading (MMSE-Despreading). Users adopting different spreading sequences originally interfere with one another, but the inter-user interference may be maximally suppressed after sequence despreading, a user signal to be demodulated is relatively clean after the inter-user interference is suppressed, and then channel estimation is performed by use of the conjugation method for further equalization and demodulation decoding. This is a key of application of the embodiment to a grant-free multiuser access scenario. When both the conjugation method and the spreading technology are applied to the grant-free scenario, the spreading sequence is, by the transmitter of the sender, independently selected, independently generated, randomly selected or determined according to the bits formed by performing CRC coding on the information bits. In an embodiment, that the spreading sequence is determined according to the bits formed by performing CRC coding on the information bits is favorable for a process that the receiver in a grant-free access solution reconstructs bits that are correctly decoded and eliminates errors. Since all the bits in a CRC codeword are correct after correct decoding and the spreading sequence is determined by the bits of the CRC codeword, determination of the spreading sequence used by the transmitter of the sender may be facilitated.

Figure 15:
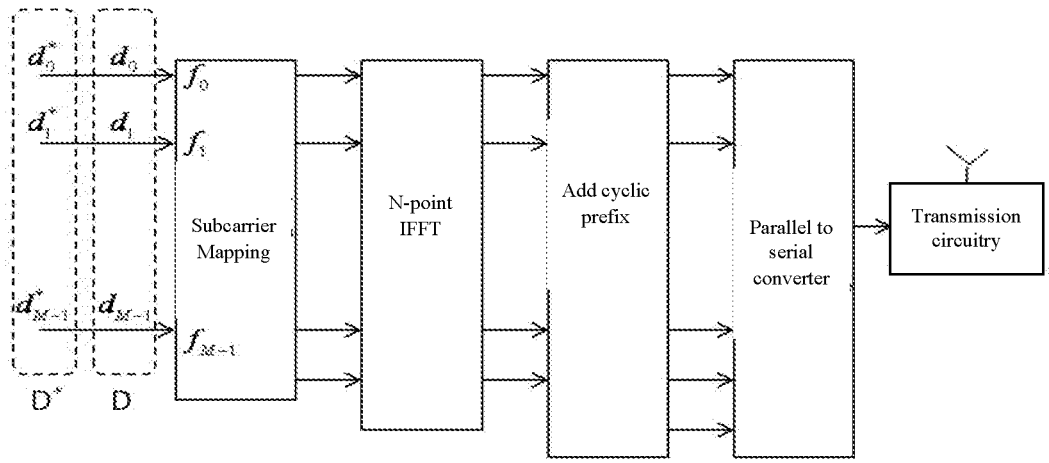
FIG. 15 is a schematic diagram of implementing conjugation in an OFDM modulation process according to an embodiment of the present disclosure.
Figure 16:
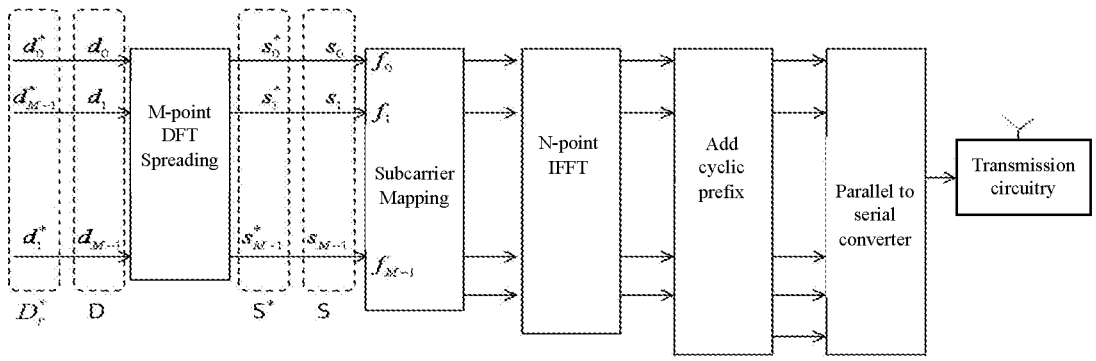
FIG. 16 is a schematic diagram of implementing conjugation in a DFT-S-OFDM modulation process according to an embodiment of the present disclosure.
Figure 17:
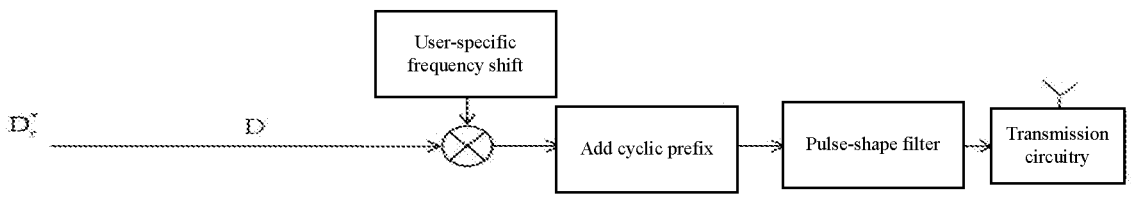
FIG. 17 is a schematic diagram of implementing conjugation in a time-domain generation process for an SC-FDMA signal according to an embodiment of the present disclosure.

Conjugation in an OFDM modulation process, a DFT-S-OFDM modulation process and a time-domain generation process for an SC-FDMA signal are described in combination with FIG. 15, FIG. 16 and FIG. 17 respectively. FIG. 15 is a schematic diagram of implementing conjugation in an OFDM modulation process according to an embodiment. In FIG. 15, symbol spreading may refer to spreading a symbol before subcarrier mapping, symbol spreading may refer to spreading a symbol after subcarrier mapping, symbol spreading may refer to spreading a symbol after IFFT, and symbol spreading may refer to spreading a symbol added with a cyclic prefix. FIG. 16 is a schematic diagram of implementing conjugation in a DFT-S-OFDM modulation process according to an embodiment. In FIG. 16, symbol spreading may refer to spreading a symbol before DFT, symbol spreading may refer to spreading a symbol after DFT, symbol spreading may refer to spreading a symbol after subcarrier mapping, symbol spreading may refer to spreading a symbol after IFFT, and symbol spreading may refer to spreading a symbol added with a cyclic prefix. FIG. 17 is a schematic diagram of implementing conjugation in a time-domain generation process for an SC-FDMA signal according to an embodiment. In FIG. 17, symbol spreading may refer to spreading a symbol before frequency translation, symbol spreading may refer to spreading a symbol after frequency translation, and symbol spreading may refer to spreading a symbol added with a cyclic prefix.

In some scenarios, for example, a low-SNR scenario, the transmitting side is required to duplicate a symbol, and the receiver merges the duplicate symbols to improve an SNR of a final symbol. In this scenario, a transmitted data frame includes a simple duplication of the data symbol, so that only a conjugation operation is additionally executed on the data symbol that is originally simply duplicated when the embodiment is applied.

The embodiment is applicable to a single-antenna technology and applicable to a single-antenna transmitter. If the transmitter on the transmitting side has only one transmitting antenna, symbols of a signal transmitted through the transmitting antenna in frequency-domain subcarriers may include both a "data symbol" and a "symbol generated by conjugating the data symbol".

If the transmitter has multiple transmitting antennae, the technology of the embodiment may also be applied. The simplest manner is that a signal in each code block or each transmission block is transmitted by use of only one transmitting antenna and the signal is not transmitted through the other antennae. Symbols in the signal transmitted through one transmitting antenna in frequency-domain subcarriers may include both a "data symbol" and a "symbol generated by conjugating the data symbol".

At the receiver

The receiver estimates a channel by multiplication of received symbols (REs) at adjacent or close moments according to a conjugation property. In an embodiment, there is made such a hypothesis that two symbols received by the receiver at adjacent moments on the same subcarrier are:

$$y_{k1}=H_{k1} \cdot s_k + n_{k1} \text{ and } y_{k2}=Hk_2 \cdot s^*_k + n^*_{k2}.$$

By use of a channel correlation, $H_{k1}=H_{k2}=H_k$ may be reasonably hypothesized (herein, $H_{k1}$ and $H_{k2}$ are schematically channels of two adjacent symbols of the same subcarrier), and then the receiver may obtain an estimate of $H_k^2$ (square of the channel $H_k$) by use of $y_{k1}, y_{k2}$. In an embodiment, $$y_{k1}y_{k2}=(H_{k1} \cdot s_k + n_{k1})(H_{k2} \cdot s^*_k + n_{k2})=|s_k|^2 H_k^2 + \hat{n}_k.$$

Herein, $\hat{n}_k = H_{k1} \cdot s_k \cdot n_{k1} + H_{k2} \cdot s^*_k \cdot n_{k2} n_{k1} n_{k2}$.

In an embodiment, if $s_k$ is a constant modulus modulation symbol, for example, xPSK (for example, BPSK/QPSK/8PSK, namely x=2/4/8), $|s_k|=1$, and $y_{k1}y_{k2}$ may further be simplified to:

$$y_{k1}y_{k2}=H_k^2 - \hat{n}_k.$$

Even so, $y_{k1}y_{k2}$ includes $H_k^2$ rather than $H_k$ finally to be equalized. For improving the estimation accuracy and reducing the influence of $\hat{n}_k$, involved $y_{k1}y_{k2}$ is required to be averaged because $\hat{n}_k$ is also averaged and $\hat{n}_k$ may be small after averaging.

Finally, for obtaining $H_k$, a root extraction operation is required to be executed on $y_{k1}y_{k2}$ or an average of $y_{k1}y_{k2}$. However, root extraction may make a "plus or minus characteristic" of the result unknown:

namely both $\hat{H}_{k+}=\sqrt{y_{k1}y_{k2}}$ and $\hat{H}_{k-}=-\sqrt{y_{k1}y_{k2}}$ may be estimates of a real channel.

Therefore, equalization is required to be performed twice during subsequent equalization: $\hat{H}_{k+}=\sqrt{y_{k1}y_{k2}}$ is adopted for one equalization, and $\hat{H}_{k-}=-\sqrt{y_{k1}y_{k2}}$ is adopted for the other equalization. After channel equalization, the "conjugate symbol pair" is merged. By merging, the SNR of the symbol may be improved.

In an embodiment, equalization is performed by use of $\hat{H}_{k+}=\sqrt{y_{k1}y_{k2}}$, and then merging is performed to obtain $$\frac{y_{k1}}{\hat{H}_{k+}} + \left(\frac{y_{k2}}{\hat{H}_{k+}}\right)^*;$$

and
equalization is performed by use of $\hat{H}_{k-}=-\sqrt{y_{k1}y_{k2}}$, and then merging is performed to obtain $$\frac{y_{k1}}{\hat{H}_{k-}} + \left(\frac{y_{k2}}{\hat{H}_{k-}}\right)^*.$$

Data obtained by performing equalization and merging twice is transmitted for demodulation decoding. If the data is correctly decoded, then it represents that the equalization is performed correctly, and the estimate corresponding to the real channel has been adopted for equalization. If the data is incorrectly decoded, then it represents that the equalization is performed incorrectly, and a reverse channel has been adopted for equalization. This is the cost of the method of the embodiment, namely, the complexity in equalization and demodulation decoding may be increased.

In SC-FDMA/DFT-S-OFDM modulation, single $s_k$ is not a constant modulus modulation symbol, but a modulus square average of K (K is far greater than 1) frequency-domain symbols on the same SC-FDMA/DFT-S-OFDM subcarrier is approximate 1, i.e., $$\left(\sum_{k=1}^{K}|s_k|^2\right)/K \approx 1.$$

By use of this characteristic, the involved $y_{k1}y_{k2}$ is averaged, namely $$\left(\sum_{k=1}^{K} y_{k1}y_{k2}\right)/K,$$

for channel estimation, and $\hat{n}_k$ in $$\left(\sum_{k=1}^{K} y_{k1}y_{k2}\right)/K$$

may also be correspondingly averaged, namely, $$\left(\sum_{k=1}^{K} \hat{n}_k\right)/K$$

may become very small. In such case, a main component $$\left(\sum_{k=1}^{K} y_{k1}y_{k2}\right)/K$$

in is the channel information. Even so, $$\left(\sum_{k=1}^{K} y_{k1}y_{k2}\right)/K$$

includes $H_k^2$ rather than $H_k$ finally to be equalized. For obtaining $H_k$, the root extraction operation is executed on $$\left(\sum_{k=1}^{K} y_{k1}y_{k2}\right)/K,$$

but root extraction may make the "plus or minus characteristic" of the result unknown. Then, like the above, equalization and decoding are performed twice, respectively.

If a small number of reference signals are inserted on the transmitting side, the plus or minus that the channel is prefixed with may be determined by use of these reference signals, so that the phase ambiguity of +H and −H of channel estimation may be avoided. Decoding is required to be performed only once after determination, so that the number of decoding times is reduced. It is to be noted that these reference signals are not general Demodulation Reference Signals (DMRSs) but only for eliminating the phase ambiguity.

When the method of the embodiment is applied, for reducing the number of decoding times, the transmitting side may adopt a convolutional code or a Polar code. This is because decoding of the convolutional code and the Polar code is relatively special, two decoding results may be obtained by performing decoding only once and then performing some processing on bits obtained by decoding, namely, a +H equalization result is decoded and a −H equalization result is decoded, and then CRC may be performed twice to judge which is the correct decoding.

The solution of the embodiment will be described below in combination with application scenarios.

First: the solution is applied to OFDM transmission that may be OFDM transmission defined in LTE.

In an OFDM-based transmission frame, a digital amplitude-phase modulation symbol (for example, BPSK/QPSK/8PSK/16QAM/64QAM) is directly arranged in a frequency-domain subcarrier, and thus the conjugation method may be easily applied. As shown in FIG. 10, only a modulation symbol $d_k$ and a conjugate $d^*_k$ [conjugate of $d_k$] of the modulation symbol are required to be arranged in two adjacent REs of a subcarrier. In general, $D=[d_0, d_1, \ldots d_{M-1}]$ and $D^*=[d_0, d_1, \ldots d_{M-1}]^*=[d^*_0, d^*_1, \ldots d^*_{M-1}]$ are modulated to (be carried in) two adjacent or close Opportunity Driven Multiple Access (ODMA) symbols, or D and D* are transmitted through two adjacent or close ODMA symbols. In an embodiment, several applications of the conjugation method are as follows.

Figure 18:
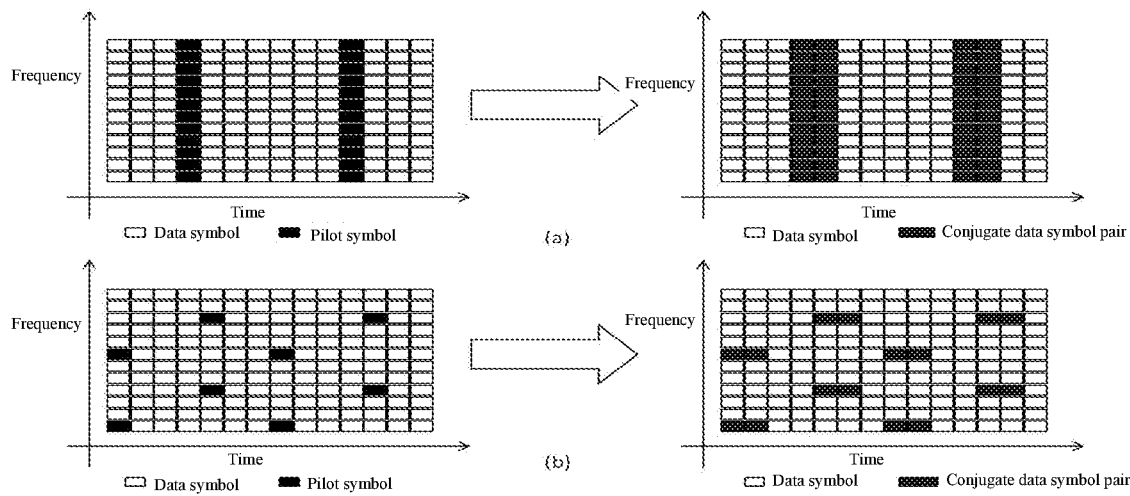
FIG. 18 is a schematic diagram of carrying a data symbol and a pilot symbol in Long Term Evolution (LTE) according to an embodiment of the present disclosure.
Figure 19:
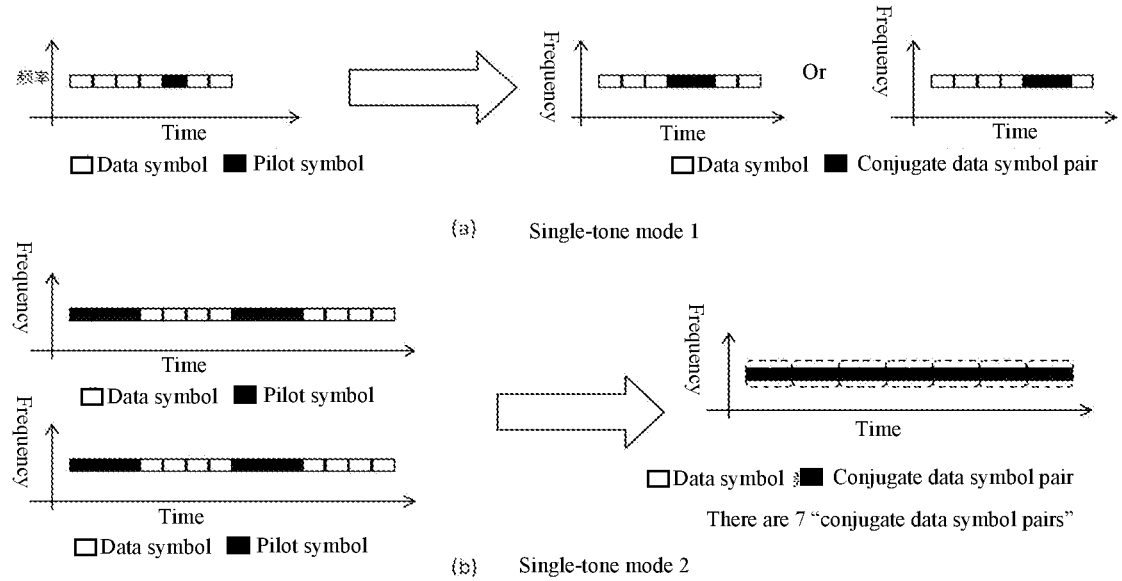
FIG. 19 is a schematic diagram of carrying a data symbol and a pilot symbol in a Narrow Band Internet of Things (NB-IoT) according to an embodiment of the present disclosure.

FIG. 18 is a schematic diagram of carrying a data symbol and a pilot symbol in LTE according to an embodiment. FIG. 19 is a schematic diagram of carrying a data symbol and a pilot symbol in an NB-IoT according to an embodiment. In the related art, an RE in dark grey carries a DMRS. When the method of the embodiment is applied, channel estimation is performed by use of data, so that a reference signal overhead may be reduced, and the data is transmitted through all REs. In an embodiment, the RE originally for arranging the reference signal is configured to arrange a symbol in a conjugate data symbol pair, and the other symbol in the conjugate data symbol pair is arranged in an adjacent RE.

(a) in FIG. 18 shows a Physical Resource Block (PRB) pair. Two OFDM symbols do not carry any digital amplitude-phase modulation symbol but are configured to carry demodulation reference pilot symbols. The two OFDM symbols are the fourth and eleventh OFDM symbols respectively. Herein, an index range of the 14 OFDM symbols is [1~14].

For improving the spectrum efficiency, the contents carried in the fourth and eleventh OFDM symbols are changed, and no DMRSs but conjugate versions of the digital amplitude-phase modulation symbols in the adjacent OFDM symbols are carried. For example, the fourth OFDM symbol carries a conjugate of a third OFDM digital amplitude-phase modulation symbol, and the eleventh OFDM symbol carries a conjugate of a tenth OFDM digital amplitude-phase modulation symbol.

There is made such a hypothesis that 12 digital amplitude-phase modulation symbols originally carried in the third OFDM symbol are $D_3=[d_0^3, d_1^3, \ldots d_{11}^3]$ and 12 digital amplitude-phase modulation symbols originally carried in the tenth OFDM symbol are $D_{10}=[d_0^{10}, d_1^{10}, \ldots d_{11}^{10}]$.

$D_3=[d_0^3, d_1^3, \ldots d_{11}^3]$ is transformed to $D^*_3=[d_0^{3*}, d_1^{3*}, \ldots d_{11}^{3*}]$ by duplication and conjugation, and $D^*_{10}$ is processed by the OFDM generation method and arranged in the fourth OFDM symbol.

$D_{10}=[d_0^{10}, d_1^{10}, \ldots d_{11}^{10}]$ is transformed to $D^*_{10}=[d_0^{10*}, d_1^{10*}, \ldots d_{11}^{10*}]$ by duplication and conjugation, and $D^*_{10}$ is processed by the OFDM generation method and arranged in the eleventh OFDM symbol.

In such a manner, the receiver may perform channel estimation by use of $D_3$ and $D^*_3$, as well as $D_{10}$ and $D^*_{10}$.

Moreover, after the channel is calculated by the conjugation method and equalization is performed, the conjugate symbol pairs are merged to improve the SNR. If there is no noise, after equalization, the 12 digital amplitude-phase modulation symbols $D_3=[d_0^3, d_1^3, \ldots d_{11}^3]$ in the third OFDM symbol and conjugates (the conjugates of the conjugates are the symbols) of 12 corresponding digital amplitude-phase modulation symbols $D^*_3=[d_0^{3*}, d_1^{3*}, \ldots d_{11}^{3*}]$ in the fourth OFDM symbols may be merged, namely, they are added and then divided by 2 to obtain:

$$\hat{d}_k^3 = \frac{d_k^3 + (d_k^{3*})^*}{2}, k = 0 \ldots 11.$$

In such a manner, the SNR of the 12 digital amplitude-phase modulation symbols of $D_3=[d_0^3, d_1^3, \ldots d_{11}^3]$ may be improved by 3 dB.

Similarly, the tenth OFDM symbol and the eleventh OFDM symbol form a conjugate pair and are also merged after equalization, and in such a manner, the SNR of the 12 digital amplitude-phase modulation symbols of $D_{10}=[d_0^{10}, d_1^{10}, \ldots d_{11}^{10}]$ may also be improved by 3 dB.

That is, the final SNRs of $D_3=[d_0^3, d_1^3, \ldots d_{11}^3]$ and $D_{10}=[d_0^{10}, d_1^{10}, \ldots d_{11}^{10}]$ may be 3 dB higher than the other data symbols. Therefore, the SNR achieved by the modulation manner for $D_3$ and $D_{10}$ is higher than the SNR achieved by another duplication and conjugation free modulation manner, and furthermore, higher spectrum efficiency is achieved. For example:

if the other data symbol modulation manner is BPSK, QPSK may be adopted for $D_3$ and $D_{10}$; and if the other data symbol modulation manner is QPSK, 8PSK may be adopted for $D_3$ and $D_{10}$.

FIG. 19 is a schematic diagram of carrying a data symbol and a pilot symbol in an NB-IoT according to an embodiment. Similarly, a mode 1 and mode 2 of a single-tone OFDM transmission manner in an NB-IoT standard in FIG. 19 are shown, and conjugate data symbol pairs are adopted for channel estimation instead of reference signals, to improve the spectrum efficiency.

In the low-SNR scenario, for example, a coverage-enhanced scenario and extreme coverage scenario defined in the NB-IoT standard, symbol duplication is originally required to improve the received SNR (the receiver merges duplicate symbols to improve the SNR of the final symbol). In this scenario, simple duplication may be replaced with "conjugation after duplication", so that the method of "channel estimation by conjugation" in the embodiment may be applied to a poor coverage scenario to achieve higher channel estimation accuracy.

Figure 20:
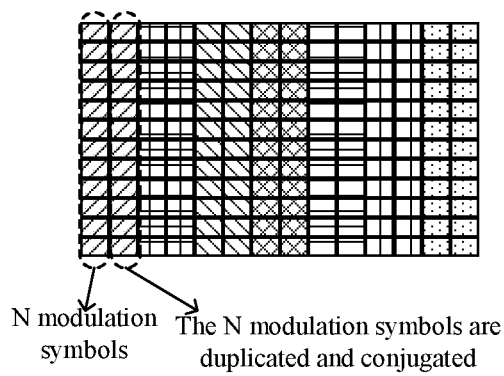
FIG. 20 is a schematic diagram of duplicating transmitted symbols according to an embodiment of the present disclosure.

FIG. 20 is a schematic diagram of duplicating transmitted symbols according to an embodiment. As shown in FIG. 20, for improving the received SNR, the transmitted symbols are duplicated once, and the 7 OFDM symbols are duplicated once to obtain 14 symbols, so that the SNR of the 7 symbols may be improved by 3 dB. When the embodiment is applied, the receiver may perform channel estimation for further equalization and demodulation decoding by use of the conjugation method only by replacing simple duplication with "conjugation after duplication".

In an embodiment, the spreading technology is further required to be combined in a multiuser scenario. The receiver performs despreading at first to suppress the inter-user interference as much as possible, then multiplies the conjugate symbol pairs for channel estimation and, after equalization, merges the duplicate symbols. In this scenario, simple duplication may be correspondingly replaced with "conjugation after duplication and then despreading", so that higher conjugation-based channel estimation accuracy may be achieved in the multiuser scenario, as shown in FIG. 14.

Second: the solution is applied to single-carrier OFDM transmission, single-carrier OFDM transmission including DFT-S-OFDM and SC-FDMA transmission, including DFT-S-OFDM and SC-FDMA in the LTE standard.

In the LTE standard, two DFT-S-OFDM/SC-FDMA symbols in an uplink PRB pair do not carry digital amplitude-phase modulation symbols but are configured to carry DMRS symbols. The two DFT-S-OFDM/SC-FDMA symbols are the fourth and eleventh OFDM symbols, respectively. Herein, an index range of the 14 DFT-S-OFDM/SC-FDMA symbols is [1~14]. In an embodiment, in case of DFT-S-OFDM, for improving the spectrum efficiency, the contents carried in the fourth and eleventh DFT-S-OFDM symbols are changed, and no DMRSs but conjugate versions of frequency-domain symbols S in the adjacent DFT-S-OFDM symbols are carried.

That is, the fourth DFT-S-OFDM symbol carries the conjugate version of the third OFDM frequency-domain symbol S3, i.e., $S^*_3$.

That is, the eleventh DFT-S-OFDM symbol carries the conjugate version of the tenth OFDM frequency-domain symbol S10, i.e., $S^*_{10}$.

Assuming that 12 digital amplitude-phase modulation symbols originally carried in the third OFDM symbol are $D_3=[d_0^3, d_1^3, \ldots d_{11}^3]$, then $S_3=[s_0^3, s_1^3, \ldots s_{11}^3]=DFT(D_3)$; and assuming 12 digital amplitude-phase modulation symbols originally carried in the tenth OFDM symbol are $D_{10}=[d_0^{10}, d_1^{10}, \ldots d_{11}^{10}]$,
$S_{10}=[s_0^{10}, s_1^{10}, \ldots s_{11}^{10}]=DFT(D_{10})$.

$S_3=[s_0^3, s_1^3, \ldots s_{11}^3]$ is transformed to $S^*_3=[s_0^{3*}, s_1^{3*}, \ldots s_{11}^{3*}]$ by duplication and conjugation, and $S^*_3$ is processed by IFFT and the like and arranged in the fourth DST-S-OFDM symbol.

$S_{10}=[s_0^{10}, s_1^{10}, \ldots s_{11}^{10}]$ is transformed to $S^*_{10}=[s_0^{10*}, s_1^{10*}, \ldots s_{11}^{10*}]$ by duplication and conjugation, and $S^*_{10}$ is processed by IFFT and the like and arranged in the eleventh DST-S-OFDM symbol.

In such a manner, the receiver may perform channel estimation by use of $S_3$ and $S^*_3$, as well as $S_{10}$ and $S^*_{10}$.

Moreover, after the channel is calculated by the conjugation method and equalization is performed, $S_3=[s_0^3, s_1^3, \ldots s_{11}^3]$ in the third DST-S-OFDM symbol and conjugates (the conjugate of the conjugate of a symbol is the symbol itself) of $S^*_3=[s_0^{3*}, s_1^{3*}, \ldots s_{11}^{3*}]$ in the fourth DST-S-OFDM symbol may be merged, namely, they are added and divided by 2 to obtain:

$$\hat{s}_k^3 = \frac{s_k^3 + (s_k^{3*})^*}{2}, k = 0 \ldots 11.$$

In such a manner, the SNR of the 12 symbols $[s_0^3, s_1^3, \ldots s_{11}^3]$ of $S_3$ may be improved by 3 dB.

Similarly, $S_{10}=[s_0^{10}, s_1^{10}, \ldots s_{11}^{10}]$ in the tenth DST-S-OFDM symbol and conjugates of corresponding $S^*_{10}=[s_0^{10*}, s_1^{10*}, \ldots s_{11}^{10*}]$ in the eleventh DST-S-OFDM symbol may also be merged:

$$\hat{s}_k^{10} = \frac{s_k^{10} + (s_k^{10*})^*}{2}, k = 0 \ldots 11.$$

In such a manner, the SNR of the 12 symbols $S_{10}=[s_0^{10}, s_1^{10}, \ldots s_{11}^{10}]$ of $S_{10}$ may also be improved by 3 dB.

Figure 21:
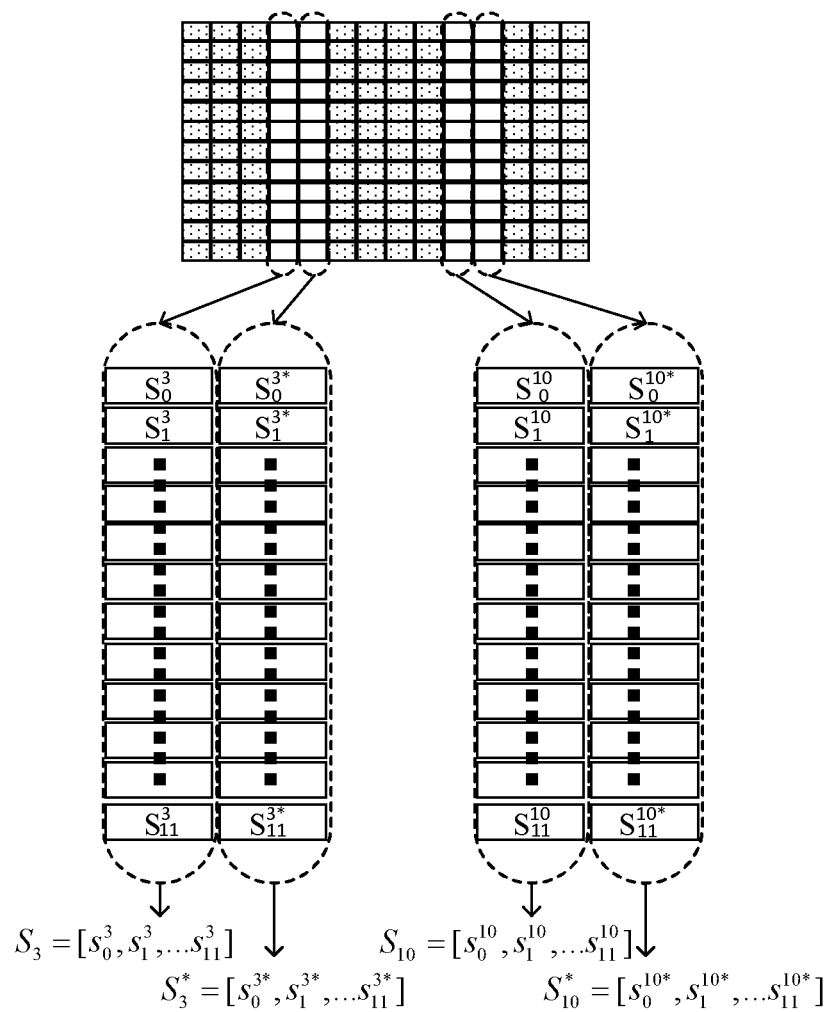
FIG. 21 is a schematic diagram of a frame structure according to an embodiment of the present disclosure.

That is, the final demodulation SNRs of $S_3$ and $S_{10}$ may be 3 dB higher than the other DST-S-OFDM frequency-domain symbols. Therefore, the SNR achieved by the modulation manner for $D_3$ and $D_{10}$ is higher than the SNR achieved by another duplication and conjugation free modulation manner, and furthermore, higher spectrum efficiency is achieved. FIG. 21 is a schematic diagram of a frame structure according to an embodiment.

If the time-domain generation method for SC-FDMA or the frequency-domain generation method, i.e., DFT-S-OFDM, is adopted, for improving the spectrum efficiency, the contents carried in the fourth and eleventh SC-FDMA/DST-S-OFDM symbols are changed, and no DMRSs but the conjugates and negative-sequence versions $D_r=[d^*_0, d^*_{M-1}, \ldots, d^*_1]$ of the digital amplitude-phase modulation symbols $D[d_0, d_1, \ldots d_{M-1}]$ in the adjacent SC-FDMA/DST-S-OFDM symbols are carried.

There is made such a hypothesis that the 12 digital amplitude-phase modulation symbols originally carried in the third SC-FDMA/DST-S-OFDM symbol are $D_3=[d_0^3, d_1^3, \ldots d_{11}^3]$ and the 12 digital amplitude-phase modulation symbols originally carried in the tenth SC-FDMA/DST-S-OFDM symbol are $D_{10}=[d_0^{10}, d_1^{10}, \ldots d_{11}^{10}]$.

Then, the contents carried in the fourth SC-FDMA/DST-S-OFDM symbol are changed, and no DMRSs but $D^*_{3r}=[d_0^{3*}, d_{11}^{3*} \ldots d_1^{3*}]$ is carried; and the contents carried in the eleventh SC-FDMA/DST-S-OFDM symbol are changed, and no DMRSs but $D^*_{10r}=[d_0^{10*}, d_{11}^{10*}, \ldots d_1^{10*}]$ is carried.

In such a manner, the receiver may perform channel estimation by use of $S_3$ and $S^*_3$, as well as $S_{10}$ and $S^*_{10}$, as described above, and then performs equalization, merging and demodulation decoding. The final demodulation SNRs of $S_3$ and $S_{10}$ may also be 3 dB higher than the other SC-FDMA/DST-S-OFDM frequency-domain symbols. Therefore, the SNR achieved by the modulation manner for $D_3$ and $D_{10}$ is higher than the SNR achieved by another duplication and conjugation free modulation manner, and furthermore, higher spectrum efficiency is achieved.

Figure 22:
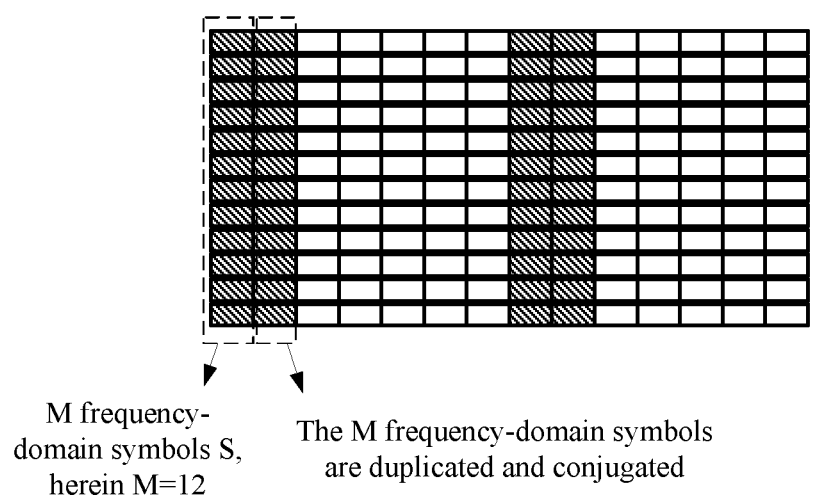
FIG. 22 is a schematic diagram of another frame structure according to an embodiment of the present disclosure.

If channel estimation is expected to be started as soon as possible to implement equalization as soon as possible in some scenarios, a data pilot may be considered to be arranged in the front. In such case, the frame structure is shown in FIG. 22. FIG. 22 is a schematic diagram of another data frame according to an embodiment.

In the low-SNR scenario, symbol duplication is required to improve the received SNR (the receiver merges the duplicate symbols to improve the SNR of the final symbol). In this scenario, simple duplication may be replaced with "conjugation after duplication", so that the method of "channel estimation by conjugation" in the embodiment may be applied to a poor coverage scenario to achieve higher channel estimation accuracy. Also as shown in FIG. 20, for improving the received SNR, the transmitted symbols are duplicated once, and the 7 SC-FDMA/DST-S-OFDM symbols are duplicated once to obtain 14 symbols, so that the SNR of the 7 symbols may be improved by 3 dB. When the embodiment is applied, the receiver may perform channel estimation for further equalization and demodulation decoding by use of the conjugation method only by replacing simple duplication with "conjugation after duplication".

Third: the conjugation method and spreading are combined for application to grant-based multiuser access or grant-free multiuser access. It is applicable to multi-carrier OFDM or single-carrier DST-S-OFDM and SC-FDMA.

Figure 23:
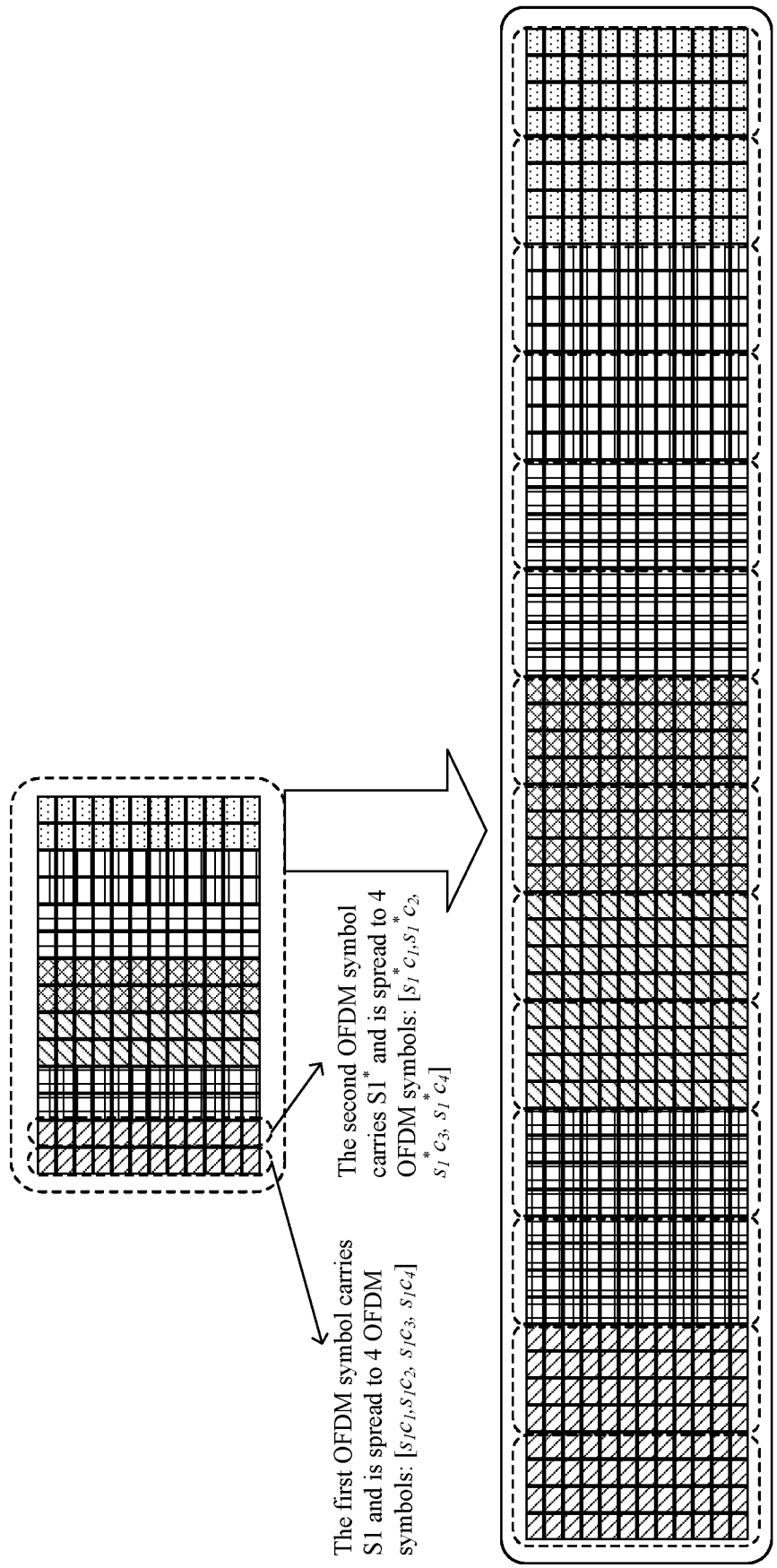
FIG. 23 is a schematic diagram of spreading conjugate symbols according to an embodiment of the present disclosure.

The transmitting side generates two OFDM symbols at first through the conjugation method of the embodiment. Herein, the OFDM symbols include multi-carrier OFDM or single-carrier DST-S-OFDM/SC-FDMA symbols. Symbols in the same subcarrier of the two OFDM symbols are conjugate. Then, the two OFDM symbols are spread to multiple OFDM symbols by use of the symbol spreading technology. The symbols before spreading and after spreading are shown in FIG. 23. FIG. 23 is a schematic diagram of spreading conjugate symbols according to an embodiment. In FIG. 23, each of the 7 OFDM symbols is duplicated and conjugated to generate 14 OFDM symbols, and then the 14 OFDM symbols are spread by use of a sequence with a length 4 one by one to generate 56 OFDM symbols.

The receiving side reduces the inter-user interference as much as possible by use of the sequence despreading technology (for example, the sequence despreading technology includes MF, ZF and MMSE), and then performs channel estimation by use of the conjugation method of the embodiment for further equalization and demodulation decoding.

When both the conjugation method and the spreading technology are applied to the grant-free scenario, the spreading sequence is, by the transmitter of the sender, independently selected, independently generated, randomly selected or determined according to the bits formed by performing CRC coding on the information bits. In an embodiment, that the spreading sequence is determined according to the bits formed by performing CRC coding on the information bits is favorable for a process that the receiver in a grant-free access solution reconstructs bits that are correctly decoded and eliminates errors. Since all the bits in a CRC codeword are correct after correct decoding and the spreading sequence is determined by the bits of the CRC codeword, determination of the spreading sequence used by the transmitter of the sender may be facilitated.

According to the embodiment, channel estimation is performed by use of no pilot (reference signal) but only data, so that the pilot overhead may be reduced, and the spectrum efficiency may be improved. This advantage is achieved for both grant-based and grant-free scenarios, for example, Ultra Low Latency and Reliable Communication (uRLLC) or other conventional Physical Uplink Shared Channel (PUSCH) enhancement. If the working SNR of the grant-based scenario is relatively low and modulation symbol duplication has been required to ensure the performance, the spectrum efficiency and the performance may be improved more obviously by the method of the embodiment. The influence of a pilot collision in the grant-free scenario may be avoided. Or, few reference signals are adopted for other purposes. For example, if channel estimation still depends on the data, a small number of reference signals are adopted to avoid the phase ambiguity of +H and −H of channel estimation.

Since a conjugate of a real number is the real number itself, for the condition that all the modulation symbols are real numbers, for example, BPSK modulation symbols valued to be −1 or +1 only, the conjugation operation in the embodiment may be omitted. This is because the conjugate of a real number is the real number itself.

Embodiment 4

The embodiment of the present disclosure also provides a storage medium, in which a computer program is stored, where the computer program is configured to run to execute the method in any embodiment of the present disclosure.

In the embodiment, the storage medium may be configured to store a computer program configured to execute the method in any embodiment of the present disclosure, for example, executing the following operations.

In operation 100, M conjugate symbol pairs are generated, where M is more than or equal to 1.

In operation 200, the conjugate symbol pairs are transmitted.

In the embodiment, the storage medium may include, but not limited to, one or more media capable of storing computer programs such as a Universal Serial Bus (USB) flash disk, a ROM, a RAM, a mobile hard disk, a magnetic disk or an optical disk.

The embodiment of the present disclosure also provides an electronic device, which includes a memory and a processor. A computer program is stored in the memory. The processor is configured to run the computer program to execute the method in any embodiment of the present disclosure.

In an embodiment, the electronic device may further include a transmission device and an input/output device. The transmission device is connected with the processor, and the input/output device is connected with the processor.

Exemplarily, in the embodiment, the processor in the embodiment may be configured to execute the following operations through the computer program.

In operation 300, M conjugate symbol pairs are generated, where M is more than or equal to 1.

In operation 400, the conjugate symbol pairs are transmitted.

Examples in the embodiment may refer to the examples described in the abovementioned embodiments and optional implementation modes and will not be elaborated in the embodiment.

It is apparent that those skilled in the art should know that one or more modules or one or more operations of the present disclosure may be implemented through a universal computing device. They may be concentrated in a single computing device or distributed in a network formed by multiple computing devices. In an embodiment, they may be implemented by program codes executable for the computing devices and thus may be stored in a storage device for execution with the computing devices. Moreover, in some cases, the shown or described operations may be executed in sequences different from those described here, or may form one or more integrated circuit modules respectively, or multiple modules or operations therein may form a single integrated circuit module for implementation. The present disclosure is not limited to any specific hardware and software combination.

What is claimed is:

1. A data transmission method, comprising:
generating M conjugate symbol pairs, wherein M is more than or equal to 1; and
transmitting the conjugate symbol pairs;
wherein the M conjugate symbol pairs comprise one of:
M symbols obtained by performing spreading processing on B modulation symbols and M symbols obtained by conjugating the M symbols obtained by performing the spreading processing, where B is more than or equal to 1;
M symbols obtained by performing DFT and spreading processing on C modulation symbols and M symbols obtained by conjugating the M symbols obtained by performing the DFT and the spreading processing, where C is more than or equal to 1;
M symbols obtained by performing spreading processing and DFT on D modulation symbols and M symbols obtained by conjugating the M symbols obtained by performing the spreading processing and the DFT, where D is more than or equal to 1;
M symbols obtained by performing DFT and spreading processing on E modulation symbols and M symbols obtained by performing DFT and spreading processing after conjugation and permutation of the E modulation symbols, where E is more than or equal to 1;
M symbols obtained by performing spreading processing and DFT on F modulation symbols and M symbols obtained by performing spreading processing and DFT after conjugation and permutation of the F modulation symbols, where F is more than or equal to 1; and
M symbols obtained by performing spreading processing and DFT on G modulation symbols and M symbols obtained by performing spreading processing, conjugation and permutation, and DFT on the G modulation symbols, where G is more than or equal to 1,
wherein the conjugation and permutation comprise one of the following conditions: the conjugation is performed before the permutation, and the conjugation is performed after the permutation; and the spreading processing refers to spreading symbols by use of a spreading sequence.

2. The method as claimed in claim 1, wherein the M conjugate symbol pairs comprise one of:
M directly conjugate symbol pairs;
M negatively conjugate symbol pairs;
M weighted conjugate symbol pairs;
M symbol pairs comprising A directly conjugate symbol pairs and M-A negatively or weighted conjugate symbol pairs, where A is more than or equal to 1;
M symbol pairs comprising A negatively conjugate symbol pairs and M-A weighted conjugate symbol pairs, where A is more than or equal to 1;
M conjugate symbol pairs, obtained by weighting, by use of a weighted value or a weighted vector, one or two symbols in each symbol pair in M directly conjugate symbol pairs; and
M conjugate symbol pairs, obtained by weighting, by use of a weighted value or a weighted vector, one or more symbols in multiple symbol pairs in M directly conjugate symbol pairs.

3. The method as claimed in claim 2, wherein the weighted value or the weighted vector is obtained in one of the following manners: configuration by a system, indication by a receiver of the symbol pairs, independent selection by a transmitter of a sender of the symbol pairs, independent generation by the transmitter of the sender of the symbol pairs, random selection by the transmitter of the sender of the symbol pairs, random generation by the transmitter of the sender of the symbol pairs, and determination by the transmitter of the sender of the symbol pairs according to the bits formed by performing CRC coding on the information bits.

4. The method as claimed in claim 1, wherein performing the conjugation and permutation of W modulation symbols comprises: conjugating and permuting the W modulation symbols $[d_0, d_1, \ldots d_{W-1}]$ to a negative sequence to obtain W modulation symbols $[e_0, e_1, \ldots e_{W-1}]$, where $e_0 = d^*_0$, $e_k = d^*_{W-k}$ and $1 \leq k \leq W-1$ or, conjugating and permuting the W modulation symbols $[d_0, d_1, \ldots d_{W-1}]$ to an opposite sequence to obtain the W modulation symbols $[e_0, e_1, \ldots e_{W-1}]$, where $e_k = d^*_{w-d-k}$ and $0 \leq k \leq W-1$,
where a value of W is equal to one of E, F and G.

5. The method as claimed in claim 1, after obtaining the M conjugate symbol pairs, further comprising one of:
   weighting one or two symbols in each conjugate symbol pair by use of a weighted value or a weighted vector to obtain M weighted conjugate symbol pairs; and
   weighting one or more symbols in multiple conjugate symbol pairs by use of a weighted value or a weighted vector to obtain M weighted conjugate symbol pairs.

6. The method as claimed in claim 1, wherein the spreading sequence is obtained in one of the following manners: configuration by a system, indication by a receiver of the symbol pairs, independent selection by a transmitter of a sender of the symbol pairs, independent generation by the transmitter of the sender of the symbol pairs, random selection by the transmitter of the sender of the symbol pairs, random generation by the transmitter of the sender of the symbol pairs, and determination by the transmitter of the sender of the symbol pairs according to bits formed by performing Cyclic Redundancy Check (CRC) coding on information bits.

7. The method as claimed in claim 1, wherein transmitting the conjugate symbol pairs comprises:
   carrying the conjugate symbol pairs by use of Frequency-domain Resource Elements (REs), wherein two REs respectively carry two symbols in one conjugate symbol pair, and the frequency-domain REs comprise one of: REs under multi-carrier Orthogonal Frequency Division Multiplexing (OFDM) modulation, REs under Single-Carrier Frequency-Division Multiple Access (SC-FDMA) modulation, and REs under single-carrier DFT-Spread-OFDM (DFT-S-OFDM).

8. The method as claimed in claim 7, wherein
   under the condition that the REs are REs under multi-carrier OFDM modulation, the M conjugate symbol pairs comprise one of: M symbols obtained by performing spreading processing on B modulation symbols and M symbols obtained by conjugating the M symbols obtained by performing the spreading processing, where B is more than or equal to 1; or,
   under the condition that the REs are REs under single-carrier DFT-S-OFDM modulation, the M conjugate symbol pairs comprise one of: M symbols obtained by performing DFT and spreading processing on C modulation symbols and M symbols obtained by conjugating the M symbols obtained by performing the DFT and the spreading processing, where C is more than or equal to 1; and M symbols obtained by performing spreading processing and DFT on D modulation symbols and M symbols obtained by conjugating the M symbols obtained by performing the spreading processing and the DFT, where D is more than or equal to 1; or,
   under the condition that the REs are REs under single-carrier DFT-S-OFDM modulation or REs under SC-FDMA modulation, the M conjugate symbol pairs comprise one of: M symbols obtained by performing DFT and spreading processing on E modulation symbols and M symbols obtained by performing DFT and spreading processing after conjugation and permutation of the E modulation symbols, where E is more than or equal to 1; M symbols obtained by performing spreading processing and DFT on F modulation symbols and M symbols obtained by performing spreading processing and DFT after conjugation and permutation of the F modulation symbols, where F is more than or equal to 1; and M symbols obtained by performing spreading processing and DFT on G modulation symbols and M symbols obtained by performing spreading processing, conjugation and permutation, and DFT on the G modulation symbols, where G is more than or equal to 1.

9. The method as claimed in claim 1, wherein transmitting the conjugate symbol pairs comprises: transmitting the conjugate symbol pairs by use of one antenna of a transmitter.

10. A data transmission device, comprising: a memory and a processor, wherein a computer program is stored in the memory; and the processor is configured to execute the computer program to perform the methods as claimed in claim 1.

11. A non-transitory computer-readable storage medium, in which a computer program is stored, the computer program being configured to run to execute the methods as claimed in claim 1.

12. A data transmission method, comprising:
   generating M symbols $[d_0, d_1, \ldots d_{M-1}]$;
   transforming the M symbols $[d_0, d_1, \ldots d_{M-1}]$ to generate M symbols $[e_0, e_1, \ldots e_{M-1}]$; and
   transmitting $[d_0, d_1, \ldots d_{M-1}]$ and $[e_0, e_1, \ldots e_{M-1}]$, wherein M is more than or equal to 1;
   wherein transforming the M symbols $[d_0, d_1, \ldots d_{M-1}]$ to generate the M symbols $[e_0, e_1, \ldots e_{M-1}]$ comprises one of:
   conjugating and permuting or transposing the M symbols $[d_0, d_1, \ldots d_{M-1}]$ to obtain the M symbols $[e_0, e_1, \ldots e_{M-1}]$;
   conjugating and permuting the M symbols $[d_0, d_1, \ldots d_{M-1}]$ to a negative sequence to obtain the M symbols $[e_0, e_1, \ldots e_{M-1}]$ here $e_0 = d_0^*$, $e_k = d_{M-k}^*$ and $1 \leq k \leq M-1$; and
   conjugating and permuting the M symbols $[d_0, d_1, \ldots d_{M-1}]$ to an opposite sequence to obtain the M symbols $[e_0, e_1, \ldots e_{M-1}]$, where $e_0 = d_0^*$, $e_k = d_{W-k}^*$ and $0 \leq k \leq M-1$;
   wherein transmitting $[d_0, d_1, \ldots d_{M-1}]$ and $[e_0, e_1, \ldots e_{M-1}]$ comprises one of:
   multiplying $[d_0, d_1, \ldots d_{M-1}]$ and/or $[e_0, e_1, \ldots e_{M-1}]$ by a specified value, then performing spreading processing by use of a spreading sequence respectively, and then transmitting a processing result;
   performing spreading processing on $[d_0, d_1, \ldots d_{M-1}]$ and $[e_0, e_1, \ldots e_{M-1}]$ by use of a spreading sequence respectively, and then transmitting a processing result; and
   performing spreading processing on $[d_0, d_1, \ldots d_{M-1}]$ and $[e_0, e_1, \ldots e_{M-1}]$ by use of a spreading sequence respectively, multiplying symbols obtained after spreading of $[d_0, d_1, \ldots d_{M-1}]$ and/or symbols obtained after spreading of $[e_0, e_1, \ldots e_{M-1}]$ by a specified value, and then transmitting a multiplication result.

13. The method as claimed in claim 12
   wherein the spreading sequence is obtained in one of the following manners: configuration by a system, indication by a receiver of symbol pairs, independent selection by a transmitter of a sender of the symbol pairs, independent generation by the transmitter of the sender of the symbol pairs, random selection by the transmitter of the sender of the symbol pairs, random generation by the transmitter of the sender of the symbol pairs, and determination by the transmitter of the sender of the symbol pairs according to bits formed by performing Cyclic Redundancy Check (CRC) coding on information bits;
   the specified value is obtained in one of the following manners: configuration by a system, indication by a receiver of the symbol pairs, independent selection by a transmitter of a sender of the symbol pairs, independent generation by the transmitter of the sender of the symbol pairs, random selection by the transmitter of the sender of the symbol pairs, random generation by the transmitter of the sender of the symbol pairs, and determination by the transmitter of the sender of the symbol pairs according to the bits formed by performing CRC coding on the information bits.

14. The method as claimed in claim 12, wherein transmitting $[d_0,d_1, \ldots d_{M-1}]$ and $[e_0,e_1, \ldots e_{M-1}]$ comprises:
transmitting $[d_0,d_1, \ldots d_{M-1}]$, $[e_0,e_1, \ldots e_{M-1}]$ in one of a Single-Carrier Frequency-Division Multiple Access (SC-FDMA) manner and a single-carrier DFT-Spread-Orthogonal Frequency Division Multiplexing (DFT-S-OFDM) manner.

15. A data transmission device, comprising: a memory and a processor, wherein a computer program is stored in the memory; and the processor is configured to execute the computer program to perform the methods as claimed in claim 12.

16. A data transmission method, comprising:
receiving M conjugate symbol pairs, wherein M is more than or equal to 1; and
performing channel estimation by use of the symbol pairs, wherein performing the channel estimation by use of the symbol pairs comprises:
acquiring a first symbol and a second symbol corresponding to two symbols of the symbol pair;
multiplying the first symbol by the second symbol to obtain a square of a channel estimation value, and executing a root extraction operation on the square of the channel estimation value to obtain the channel estimation value and a negative value of the channel estimation value;
after channel equalization is performed on the first symbol and the second symbol by use of the channel estimation value respectively, merging two obtained equalization results as a first equalization result;
after channel equalization is performed on the first symbol and the second symbol by use of the negative value of the channel estimation value respectively, merging two obtained equalization results as a second equalization result; and
performing Cyclic Redundancy Check (CRC) on results obtained by demodulating and decoding the first equalization result and the second equalization result to determine whether the results are correctly decoded or not.

17. The method as claimed in claim 16, wherein the M conjugate symbol pairs are carried in 2M frequency-domain Resource Elements (REs), where the REs comprise one of: REs under multi-carrier Orthogonal Frequency Division Multiplexing (OFDM) modulation, REs under Single-Carrier Frequency-Division Multiple Access (SC-FDMA) modulation, and REs under single-carrier Discrete Fourier Transform-Spread-OFDM (DFT-S-OFDM) modulation.

18. A data transmission device, comprising: a memory and a processor, wherein a computer program is stored in the memory; and the processor is configured to execute the computer program to perform the methods as claimed in claim 16.

\* \* \* \* \*